US011598640B2

(12) United States Patent
van der Vlist et al.

(10) Patent No.: US 11,598,640 B2
(45) Date of Patent: Mar. 7, 2023

(54) METHODS AND SYSTEMS OF PROVIDING LANE INFORMATION USING A NAVIGATION APPARATUS

(71) Applicants: TomTom International B.V., Amsterdam (NL); TomTom Navigation B.V., Amsterdam (NL)

(72) Inventors: Bram Jan Jacobus van der Vlist, Utrecht (NL); Hendrik Sebastian Ziezold, Amsterdam (NL); Gino Johannes Apolonia van den Bergen, Helmond (NL); Anatoliy Samara, Amsterdam (NL); James William Weir, Upholland (GB); Maarten Wim Gribnau, Delft (NL); Jan Hendrik Hammink, Amsterdam (NL)

(73) Assignees: TomTom International B.V., Amsterdam (NL); TomTom Navigation B.V., Amsterdam (NL)

( * ) Notice: Subject to any disclaimer, the term of this patent is extended or adjusted under 35 U.S.C. 154(b) by 0 days.

(21) Appl. No.: 16/756,431

(22) PCT Filed: Sep. 11, 2018

(86) PCT No.: PCT/EP2018/074437
§ 371 (c)(1),
(2) Date: Apr. 15, 2020

(87) PCT Pub. No.: WO2019/052998
PCT Pub. Date: Mar. 21, 2019

(65) Prior Publication Data
US 2021/0372803 A1 Dec. 2, 2021

(30) Foreign Application Priority Data

Sep. 12, 2017 (GB) .................................... 1714613
Oct. 18, 2017 (GB) .................................... 1717081

(51) Int. Cl.
*G01C 21/34* (2006.01)
*G01C 21/36* (2006.01)

(52) U.S. Cl.
CPC ..... *G01C 21/3461* (2013.01); *G01C 21/3492* (2013.01); *G01C 21/3658* (2013.01)

(58) Field of Classification Search
CPC ............ G01C 21/3461; G01C 21/3492; G01C 21/3658
See application file for complete search history.

(56) References Cited

U.S. PATENT DOCUMENTS

| 10,612,935 B2 * | 4/2020 | van Dok ............ G01C 21/3667 |
| 2002/0013659 A1 * | 1/2002 | Kusama ............ G01C 21/3635 701/437 |

(Continued)

FOREIGN PATENT DOCUMENTS

| CN | 105043397 A | 11/2015 |
| JP | 2008151752 A | 7/2008 |

(Continued)

OTHER PUBLICATIONS

Machine translation for JP2010230398, Katsuyama Yuji, Oct. 14, 2010.*

(Continued)

*Primary Examiner* — Faris S Almatrahi
*Assistant Examiner* — Abdalla A Khaled
(74) *Attorney, Agent, or Firm* — Park, Vaughan, Fleming & Dowler LLP

(57) ABSTRACT

A method is disclosed for providing information using a navigation apparatus to guide a user in a vehicle along a determined route to a destination through a road network. The method comprises generating data indicative of a navigation map for display on a display device of a navigation apparatus showing the roads in a portion of the road network. The method further comprises generating data indicative of a first route line for display on the navigation map showing the one or more roads to be taken from a current position of the navigation apparatus to follow the determined route through the road network, and then providing the data indicative of the navigation map and the first route line to the display device for display thereon. The method further comprises generating, upon determining, while the vehicle is traveling along the determined route, that the (Continued)

current position of the navigation apparatus on a multi-lane roadway is approaching an associated road junction, data indicative of a lane guidance panel based on a position of the road junction in the navigation map that, when displayed on the display device, covers a portion of the navigation map. The method further comprises generating data indicative of a second route line for display at least on the lane guidance panel indicating one or more lanes in which the user should be travelling so as to follow the determined route, and then providing the data indicative of the lane guidance panel and the second route line to the display device for display thereon.

20 Claims, 11 Drawing Sheets

(56) References Cited

U.S. PATENT DOCUMENTS

| | | | |
|---|---|---|---|
| 2008/0195314 A1* | 8/2008 | Green | G01C 21/3632 701/436 |
| 2010/0013669 A1* | 1/2010 | Tanaka | G01C 21/36 340/905 |
| 2010/0131190 A1* | 5/2010 | Terauchi | G01C 21/3658 701/533 |
| 2012/0191344 A1* | 7/2012 | Iao | G01C 21/3658 701/450 |
| 2021/0188172 A1* | 6/2021 | Han | B60W 30/09 |

FOREIGN PATENT DOCUMENTS

| | | | |
|---|---|---|---|
| JP | 2010230398 | * | 10/2010 |
| JP | 2015206680 A | | 11/2015 |

OTHER PUBLICATIONS

H20L Tech. (Jun. 6, 2017). Sygic vs Garmin 61 SATNAV—YouTube. Retrieved Nov. 10, 2021, from https://www.youtube.com/watch?v=-EvF_U4c2xs).*

"Sygic GPS Navigation for Android Version 12.1."YouTube, YouTube, Jun. 26, 2012, https://www.youtube.com/watch?v=Snwl3dZNChk.*

Search Report for PCT application No. PCT/EP2018/074437 dated Nov. 15, 2018.

* cited by examiner

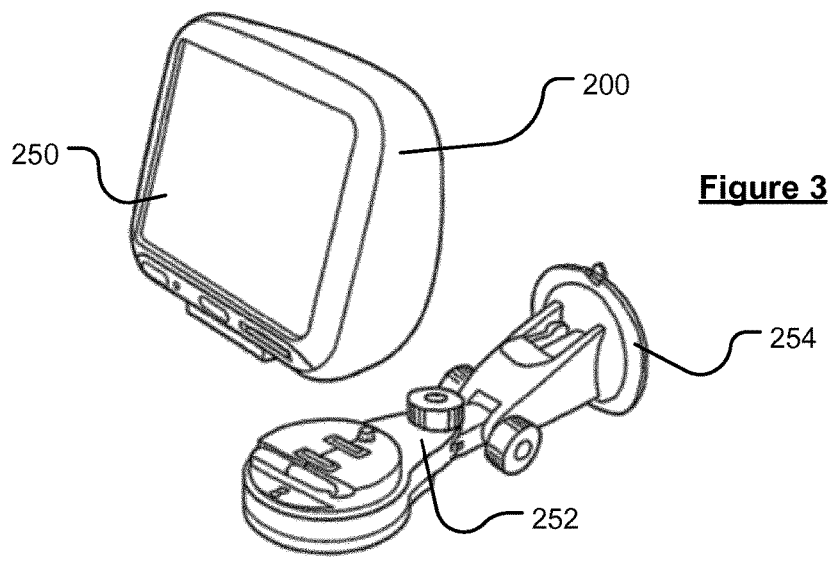
Figure 3
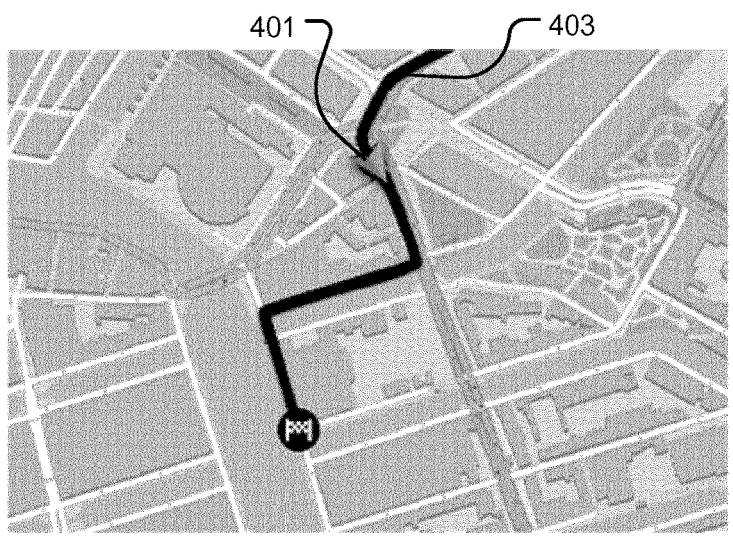
Figure 4A
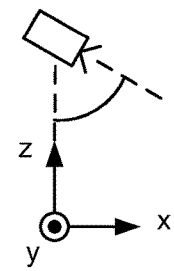
Figure 4C
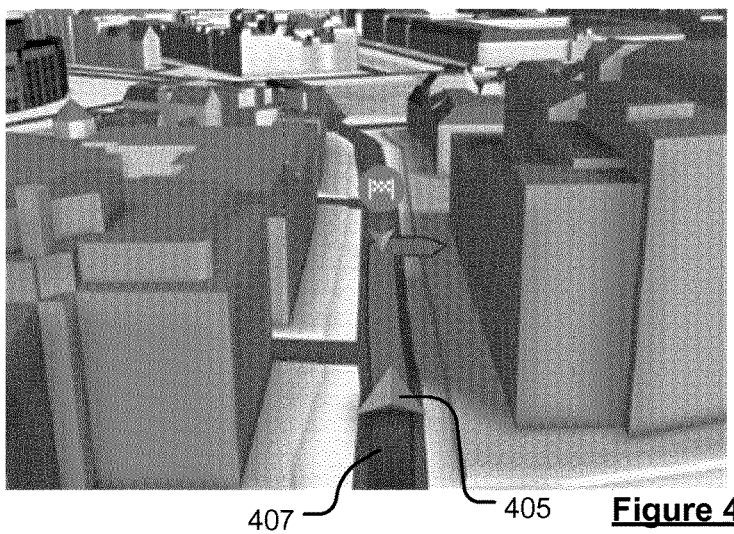
Figure 4B
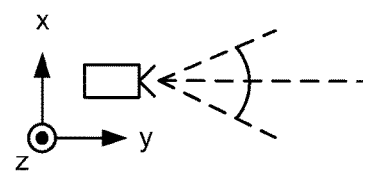

METHODS AND SYSTEMS OF PROVIDING LANE INFORMATION USING A NAVIGATION APPARATUS

CROSS-REFERENCE TO RELATED APPLICATIONS

The present application is a National Stage of International Application No. PCT/EP2018/074437, filed on Sep. 11, 2018, and designating the United States, which claims benefit to United Kingdom Applications 1714613.5 filed on Sep. 12, 2017 and 1717081.2, filed on Oct. 18, 2017. The entire content of these applications is incorporated herein by reference.

FIELD OF THE INVENTION

This invention relates to methods and systems for providing lane information to a user of a navigation apparatus. The invention also extends to a navigation apparatus arranged to carry out the methods of the present invention. Illustrative embodiments of the invention relate to navigation apparatus in the form of portable navigation devices, so-called PNDs, that include global navigation satellite signal reception and processing functionality, and to methods of operating such devices. The invention is also applicable to navigation apparatus which forms part of an integrated navigation system, e.g. an in-vehicle navigation system, and methods of operating the same.

BACKGROUND TO THE INVENTION

The present invention is directed to methods of providing lane information, e.g. instructions as to which lane or lanes a vehicle should be in to perform a particular manoeuvre at a junction of road network, to a user of a navigation apparatus, and to a navigation apparatus arranged for carrying out the steps of the methods in accordance with embodiments of the invention. The navigation apparatus may comprise navigation apparatus of any suitable form as discussed above, and in more detail below.

One illustrative embodiment of the apparatus is a portable navigation device. Portable navigation devices (PNDs) that include GPS (Global Positioning System) signal reception and processing functionality are well known and are widely employed as in-car or other vehicle navigation systems. In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like. PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, TomTom International B.V. provides an on-line route planning and navigation facility at routes.tomtom.com, which facility allows a user to enter a start point and a destination whereupon the server to which the user's PC is connected calculates a route (aspects of which may be user specified) and generates a set of exhaustive navigation instructions for guiding the user from the selected start point to the selected destination.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

During navigation along calculated route, it is usual for such PNDs to provide visual and/or audible instructions to guide the user along a chosen route to end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

As mentioned above, there are a number of typical ways of providing navigation instructions to a user to allow them to follow a determined route; such navigation instructions commonly being referred to as turn-by-turn instructions. Most rely on displaying a representation of the world, and typically the road network, around the current position of the device and/or user, together with graphical icons indicating the current position of the device and/user and the route to be followed. The representation of the world will typically be a computer generated image from a particular point of view.

For example, one common representation is a two-dimensional (2D) view in which an image is generated as though from a camera (see FIG. 4C) positioned at an elevated position, in the z-direction, and with a pitch angle of 0° so as to show a bird's eye view of the area around the current position of the device. An example of such a view is shown in FIG. 4A and in which the current position of the device is shown by icon 401 and the predetermined route being followed is shown by the route line 403. In this view, the camera may move in the x-y plane (i.e. the plane perpendicular to the z-axis and thus parallel to the surface on which the device is moving) so as to track the movements of the device along the route.

Another common representation is a three-dimensional (3D) view in which an image is generated as though from a camera positioned at an elevated position, but which has a pitch angle of 30° for example (a 90° pitch angle being such that the camera is pointed parallel to the plane of the surface, see FIG. 4C) so as to show a perspective view of the area around the current position of the device. An example of such a view is shown in FIG. 4B, and wherein it will be appreciated the camera is located at a predetermined position behind the current position of the device, i.e. in the x-y plane, based on the direction of travel of the device, so that an icon 405 representative of the current position of the device can be shown in the view. In this view the camera will typically track the movements of the device along the predetermined route which is depicted by route line 407; the viewing angle of the camera thus being centred along the direction of travel of the device (or along the path of the predetermined route).

For some complex junctions, it is also known to show a combination of the 3D guidance view together with a schematic view of the approaching junction to the user showing the manoeuvre to be made in more detail. An example of such a view is shown in FIG. 5 in which the guidance view 500 is shown on the left side of the screen and the junction view 501 is shown on the right side of the screen. More specifically, the guidance view 500 displays the route to be followed by the line 502, the current position of the device by the icon 503, and the manoeuvre to be made at the next junction by the arrow 504. Meanwhile, in the junction view 501, the arrows 508 indicate which lanes of the road the user needs to be in to complete the desired manoeuvre. Despite these improvements to the standard guidance modes, e.g. as shown in FIGS. 4A and 4B, however the Applicant has recognised that using a static image of a junction, i.e. junction view 501, together with a moving image showing progress toward the junction, i.e. guidance view 500, can lead to confusion.

Another method of providing navigation (or guidance) instructions is to superpose the instructions over images from a camera showing the area in front of the device in order to "augment reality". Additional details about such devices can be found, for example, in WO 2006/132522 A1, of TomTom International B.V, published 14 Dec. 2006; the entire content of which is incorporated herein by reference. Similarly, and rather than superposing the instructions over a camera image and displaying the resultant combination on a display screen, it is also known to project the instructions, e.g. onto surface, as part of a heads-up display (HUD) such that the user can see the instructions in their field of view. As will be appreciated, however, and particularly in the case of complex junctions and intersections, displaying instructions in this manner do not always provide the user with sufficient insight as to the composition of an approaching junction or the manoeuvres that need to be made at the junction.

The Applicant has therefore realised that there remains a need for improved methods of displaying navigation instructions to a user.

SUMMARY OF THE INVENTION

In accordance with a first aspect of the invention there is provided a method of providing information using a navigation apparatus to guide a user in a vehicle along a determined route to a destination through a road network comprising a plurality of roads including one or more multi-lane roadways, each multi-lane roadway being associated with at least one road junction at which vehicles in a first set of one or more lanes can leave the multi-lane roadway via a first exit and vehicles in a second set of one or more lanes can continue on the multi-lane roadway or leave the multi-lane roadway via a second exit, the method comprising:

obtaining a current position of the navigation apparatus;

generating data indicative of a navigation map for display on a display device of the navigation apparatus showing the roads in a portion of the road network based on the obtained current position;

generating data indicative of a first route line for display on the navigation map showing the one or more roads to be taken from the obtained current position to follow the determined route through the road network; and providing the data indicative of the navigation map and the first route line to the display device for display thereon, the navigation map and first route line being updated as the vehicle travels along the determined route, the method further comprising:

upon determining, while the vehicle is traveling along the determined route, that the current position of the navigation apparatus on a multi-lane roadway is approaching an associated road junction, generating data indicative of a lane guidance panel that, when displayed on the display device, covers a portion of the navigation map;

generating data indicative of a second route line for display at least on the lane guidance panel indicating one or more lanes in which the user should be travelling so as to follow the determined route; and providing the data indicative of the lane guidance panel and the second route line to the display device for display thereon.

The present invention extends to systems including means for carrying out a method in accordance with any of the aspects or embodiments of the invention described herein.

Accordingly, in accordance with a further aspect of the invention, there is provided a system for providing information using a navigation apparatus to guide a user in a vehicle along a determined route to a destination through a road network comprising a plurality of roads including one or more multi-lane roadways, each multi-lane roadway being associated with at least one road junction at which vehicles in a first set of one or more lanes can leave the multi-lane roadway via a first exit and vehicles in a second set of one or more lanes can continue on the multi-lane roadway or leave the multi-lane roadway via a second exit, the system comprising:

means for obtaining a current position of the navigation apparatus;

means for generating data indicative of a navigation map for display on a display device of the navigation apparatus showing the roads in a portion of the road network based on the obtained current position;

means for generating data indicative of a first route line for display on the navigation map showing the one or more roads to be taken from the obtained current position to follow the determined route through the road network; and means for providing the data indicative of the navigation map and the first route line to the display device for display thereon, the navigation map and first route line being updated as the vehicle travels along the determined route, the system further comprising:

means for generating data indicative of a lane guidance panel that, when displayed on the display device, covers a portion of the navigation map, wherein the data indicative of the lane guidance panel is generated upon determining, while the vehicle is traveling along the determined route, that the current position of the navigation apparatus on a multi-lane roadway is approaching an associated road junction;

means for generating data indicative of a second route line for display at least on the lane guidance panel indicating one or more lanes in which the user should be travelling so as to follow the determined route; and means for providing the data indicative of the lane guidance panel and the second route line to the display device for display thereon.

It will be appreciated that the invention in the second and further aspects may comprise any or all of the features described in respect of the method of the first aspect of the invention, and vice versa. Thus, if not explicitly stated, the method may comprise the steps of controlling the apparatus to perform any (or all) of the functions described in relation to the system or apparatus, and the system or apparatus of the invention may be arranged to perform any (or all) of the method steps herein described. The system or apparatus may comprise a set of one or more processors arranged to carry out the steps mentioned. Any step may be carried out by any one of the processors, or by multiple processors. It will be appreciated that the method may be a method of operating a navigation apparatus.

The means for carrying out any of the steps of the method according to any of the aspects or embodiments described herein may generally comprise a set of one or more processors (or processing circuitry) configured, e.g. programmed with a set of computer readable instructions, for doing so. A given step may be carried out using the same or a different set of processors to any other step. Any given step may be carried out using a combination of sets of processors. The system may further comprise data storage means, such as computer memory, for storing, for example, the at least one repository including the instructive and informative data.

Any of the methods in accordance with the present invention may be implemented at least partially using software, e.g. computer programs. The present invention thus also extends to a computer program comprising computer readable instructions executable to perform, or to cause a device, e.g. portable navigation device and/or server, to perform a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

As will be discussed in more detail below, the method of the present invention is preferably performed by a navigation application executed on one or more processors of a mobile navigation apparatus. The mobile navigation apparatus can be a dedicated apparatus having a primary purpose of providing guidance, and optionally route planning, functionality. Alternatively the mobile navigation apparatus could be a general computing system, e.g. a mobile telephone, and typically having location determining means, such as a global navigation satellite systems (GNSS) receiver. Again alternatively, albeit in less preferred embodiments, the navigation application could be executed on or more processors of a server that is in communication with a mobile navigation apparatus, such that the current position is obtained from the navigation apparatus, e.g. over a mobile telecommunications network, and the data indicative of the navigation map, lane guidance panel, first route line and/or second route line is provided from the server to the mobile navigation apparatus, e.g. over a mobile telecommunications network, for display thereon.

In accordance with the invention, information may be provided for display on a display device, e.g. a graphical user interface (GUI), of a navigation apparatus to a user in a vehicle to guide the user along a determined route to a destination through a road network, and specifically when approaching a road junction on a multi-lane roadway at which the vehicle needs to be in a first set of one or more lanes to leave the roadway (via an exit roadway) or in a second set of one or more lanes to continue along the roadway (or leave via a different exit roadway). Typically, when following the determined route, the user is presented with a GUI that includes a navigation map, which shows the roads in a portion of the road network based on the current position of the navigation application, together with a first route line that is overlaid on the navigation map showing the one or more roads to be taken from the current position in order to follow the determined route. As will be discussed in more detail below, the GUI will preferably also include an icon representing the current position of the navigation apparatus, which is also overlaid on the navigation map. The navigation map, first route line and preferably current position icon are updated as the vehicle travels along the determined route. This display mode may thus be referred to as "navigation guidance mode". Typically, the display may provide such navigation guidance for a major part of journey along the determined route. However, in accordance with the invention, when the navigation apparatus is approaching a road junction on a multi-lane roadway, and specifically when the navigation apparatus is approaching a road junction wherein a lane manoeuvre may be required, the GUI is modified to include a lane guidance panel that covers a portion of the navigation map, and preferably that covers the portion of the navigation map between the current position of the navigation apparatus and the position of the road junction in the navigation map, e.g. the portion of the navigation map extending from the bottom of the display, where the route line is displayed such that the route extends from the bottom to the top of the display, up to the position of the road junction, together with a second route line that indicates the lanes in which the user should be travelling so as to follow the determined route. That is, when approaching a road junction, the display changes from the normal navigation guidance mode into a "lane guidance mode". In the lane guidance mode, the second route line indicating the one or more lanes in which the user should be travelling in order to continue along the route is displayed at least on the lane guidance panel. However, the uncovered portion of the navigation map is still visible. The user may thus be simultaneously presented with both lane guidance information (e.g. the second route line) on the lane guidance panel and also with details of the navigation map at least in the uncovered portion. Accordingly, the lane guidance information, being provided on a panel that covers a portion of the navigation map, with the uncovered portion of the navigation map still being visible, may be presented in a more natural way, within the context of the map, as explained further below. Particularly, the user may be presented in a natural way with the lane guidance information required before the road junction whilst still being able to see the continuation of the route beyond the junction, e.g. in the uncovered portion of the navigation map. This allows the user to obtain lane guidance relating to a manoeuvre to be made at a road junction and guidance relating to the path to be followed after the road junction in a single consistent view, instead of, for example, a split screen guidance and junction view as depicted in FIG. 5.

In accordance with the invention, information is provided to a user, e.g. a driver of a vehicle, to guide the user along a determined route to a destination through a road network. The road network comprises a plurality of roads including one or more multi-lane roadways. A multi-lane roadway means a roadway that has multiple lanes, which are not separated by a physical divider or central reservation, for vehicles travelling in the same direction, so that vehicles may manoeuvre or switch between lanes as they travel along the roadway. Such multi-lane roadways are associated with one or more road junctions, such as an intersection (at grade junction) or interchange (grade separated junction), at which vehicles in a first set of one or more (adjacent) lanes can leave the roadway using an exit roadway or can carry on along the roadway (or leave with a different exit roadway) in a second set of one or more (adjacent) lanes. Such road junctions may e.g. be a complex motorway junction. However, it will be appreciated that the road junction may be any road situation where lane guidance may be desired. A road junction is thus generally any junction along the multi-lane roadway in which the user must make a decision as to which lane they should be travelling in to continue along the determined route. The road junction may thus be characterised by having one or more exit lanes, and also a split point (or decision point), by which point the vehicle must be in the correct lane in order to safely continue along the determined route.

The method may comprise calculating the (or a) route to the destination. The route is calculated from an origin, which may for example be the current position of the navigation apparatus, to the destination. The destination may be set by the user, or could be predicted based on the travel history of the user, e.g. using the time of departure, day of departure and origin. The method may, in some embodiments, therefore comprise receiving an origin and/or destination from the user that is used to calculate the route. The route may be calculated in any suitable manner, and may be in accordance with user specified criteria, such as the fastest route, the shortest route, the most fuel efficient route, etc. The step of calculating the route may be carried out by the navigation apparatus. Alternatively, the route calculation may be carried out remotely from the navigation apparatus, e.g. on a server, based on an origin, such as the current position of the navigation apparatus, and destination received over a communications link from the navigation apparatus. In such embodiments, data indicative of the (pre)determined route may be sent to the navigation apparatus from the server over the communications link.

The route is calculated using a digital map having a plurality of segments that represent the navigable network, e.g. road network. The digital map, which is also referred to as an electronic map herein, (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc. The electronic map may also contain data representative of the names of the roads within the road network.

The invention comprises obtaining a current position of the navigation apparatus. The navigation apparatus is portable, i.e. capable of traversing the navigable network, whether embodied as a hand-held PND, mobile phone, or mounted on or within a vehicle. As the navigation apparatus is associated with the user, the current position of the navigation apparatus can be seen as being analogous to the current position of the user, e.g. driver. The navigation apparatus comprises a location determining device that is capable of determining the current position of the navigation apparatus in relation to the navigable network. The location determining device may comprise any location detection means for determining the location of the apparatus, e.g. a global navigation satellite system (GNSS), e.g. GPS or GLONASS, receiver. As will be appreciated, the apparatus may use other means for determining its current position as desired, e.g. terrestrial beacons, the mobile telecommunications network, etc.

In embodiments in which the method is performed on the navigation apparatus, the step of obtaining a current position of the navigation apparatus can include determining the current position of the navigation apparatus using location determining means of the navigation apparatus. In other embodiments, e.g. in which the method is performed on a server, the step of obtaining a current position of the navigation apparatus can include receiving the current position of the navigation apparatus, as determined by a location determining means associated with the navigation apparatus, over a communications link, which may be wired or wireless, from the navigation apparatus. The location determining means may generally comprise a GNSS receiver, such as a GPS or GLONASS receiver.

The invention comprises determining, and thus generating, data indicative of a navigation map showing the roads in a portion of the road network based on the obtained current position, and optionally other features of the world such as buildings, wherein said data is used to display the navigation map on a display device of the navigation apparatus. As will be appreciated, the representation of the world is a computer generated image from a particular point of view, and generated from digital map data. The navigation map thus provides a schematic representation of the road network, and preferably does not include lane information, e.g. the number of lanes, road markings, etc. The navigation map can be a two-dimensional (2D) representation of the world around the current position of the navigation apparatus, e.g. in which the image is generated as though from a camera positioned at an elevated position (above the ground) and with a pitch angle of 0°, e.g. as depicted in FIG. 4A. Preferably, however, the navigation map is a three-dimensional (3D) representation of the world around the current position of the navigation apparatus, e.g. in which the image is generated as though from an elevated camera with an acute pitch angle, i.e. between 0° and 90°, positioned behind the current position of the navigation apparatus so as to show a perspective view of the area around the apparatus. Any acute pitch angle could be used as desired, although typically an angle of between 20° to 40° is used, and preferably 30°.

The method of the present invention further includes determining, and thus generating, data indicative of a first route line showing the one or more roads to be taken from the obtained current position to follow the or a (pre)determined route through the road network, wherein said data is used to display the first route line on the displayed navigation map. The first route line is thus superimposed over the road or roads of the navigation map that form the determined route being followed by the user of the navigation apparatus. As will be appreciated, the first route line, as with the navigation map, is generated from digital map data, since the first route line needs to follow the geometry of the road or roads of the road network displayed in the navigation map forming the determined route. It will also be appreciated, the first route line is generated based on data indicative of the determined route, e.g. as calculated by the navigation apparatus or as received over a communications link from a remote server. The first route line may be displayed at least during the navigation guidance mode.

Preferably, the method further includes generating, for display on or with the first route line, data indicative of an icon representing the current position of the navigation apparatus, and providing the generated data to the display device for display thereon. The current position icon is preferably superimposed over the first route line on the displayed navigation map, so as to show the progress of the vehicle along the determined route.

The navigation map, first route line, and, preferably, current position icon are updated to follow the vehicle (and thus navigation apparatus) as it travels along the determined route, such that the GUI displayed to the user reflects the current surroundings around the vehicle.

The present invention further comprises, as the navigation apparatus (and thus vehicle) traverses the determined route and is travelling along a multi-lane roadway, a step of determining whether the navigation apparatus is approaching an associated road junction in the roadway, e.g. a junction at which vehicles in a first set of one or more (adjacent) lanes can leave the roadway using an exit roadway or can carry on along the roadway in a second set of one or more (adjacent) lanes. Particularly, the present invention may comprise a step of determining when the navigation apparatus is approaching a road junction in the roadway where it is desired to provide lane guidance advice to the user, e.g. a junction of the type described above at which vehicles in a first set of one or more (adjacent) lanes can leave the roadway using an exit roadway or can carry on along the roadway in a second set of one or more (adjacent) lanes. For example, the invention may comprise determining whether the current position of the navigation apparatus is at a (first) predetermined distance from an associated road junction on the roadway. The location of the road junction is preferably defined in the digital map (accessible by the navigation apparatus). The location of the road junction used in the step of determining whether the navigation apparatus is approaching the road junction may comprise a split point of the junction, or may comprise for example the location of the highest extent of the road junction on the map. The split point is the point at which the first set of lanes separates (or splits) from the second set of lanes. The split point may comprise the point at which the roads actually split, but generally the split point is defined as the point by which the user must be in the correct lane in order to safely continue along the determined route (i.e. the point beyond which it is no longer possible to safely switch lanes). The predetermined distance is preferably a distance from the current position to the road junction, e.g. to the split point or the highest extent of the road junction in the map, along the multi-lane roadway.

When such a determination is made (i.e. upon determining that the navigation apparatus is approaching a road junction where it may be desired to provide lane guidance advice), the method further comprises determining, and thus generating, data indicative of a lane guidance panel for display on the display device. That is, when it is determined that the navigation apparatus is approaching a road junction, the display may change from the normal navigation guidance mode to a lane guidance mode. The predetermined distance may thus be a selected or programmed threshold distance, indicative of a threshold point associated with the junction, chosen so that lane guidance information is provided to the user at an appropriate distance ahead of the road junction to allow the user to safely perform any lane manoeuvres required to continue along the determined route. The predetermined distance can be any value as desired in order to provide the lane guidance information at an appropriate distance ahead of the road junction, but in a preferred embodiment is between 500 m and 1 km, such as 800 m. In principle, the predetermined distance(s) may be different for different road junctions, in which case the predetermined distance for each road junction may be stored in the map data. The determination can be made (and hence lane guidance information provided) at all road junctions along multi-lane roadways, or only certain road junctions. For example, the determination may be made only for certain road junctions along the roadway where a lane manoeuvre or switch may be required in order to continue along the determined route. For instance, lane guidance information may only be required where the user has to exit the roadway or switch lanes. If the determined route involves continuing along the roadway, so that no lane manoeuvres are required, it may not normally be necessary to provide lane guidance (although of course this may be provided if desired).

In embodiments, the lane guidance panel (and any associated information for display thereon) may be generated when it is determined that the navigation apparatus is approaching the road junction regardless of whether or not there are other exits and/or junctions within the predetermined distance of the junction. That is, in embodiments, and in contrast to some existing systems, the presentation of the lane guidance information for a road junction is preferably not postponed until the last exit before the exit to be taken is passed and instead is presented upon determining that the navigation apparatus is approaching the road junction (e.g. upon determining that the navigation apparatus is at the predetermined distance from the road junction). In this way, the user may be presented with the information in good time before the junction regardless of the road situation.

The lane guidance panel, when displayed on the display device, covers a portion of the navigation map. Thus, an uncovered portion of the navigation map generally remains visible on the display device alongside the lane guidance panel. The portion of the navigation map covered by the lane guidance panel is preferably based on the position of the road junction in the navigation map. The position of the road junction in the navigation map used to determine the portion of the navigation map covered by the lane guidance panel may be determined using the split point (e.g. the decision point) of the road junction. However, more preferably, the position of the road junction used to determine the portion of the navigation map covered by the lane guidance panel is determined based on (e.g. as being) the highest extent of the road junction in the navigation map. The lane guidance panel thus preferably covers and extends beyond the split point of the road junction (the position of the split point may therefore also be displayed on the lane guidance panel). The lane guidance panel preferably covers a portion of the navigation map including the area between the current position of the navigation apparatus and the position of the road junction in the navigation map, i.e. including the portion of the route leading up to the position of the road junction. The uncovered portion of the navigation map may generally therefore show the continuation of the map (and route) beyond the junction. The user may thus be able to look ahead into the portion of the navigation map beyond the junction to see the continuation of the route. Thus, for example, when the navigation map is a 3D representation of the world around the current position of the navigation apparatus, and where the current position icon is near to the bottom of the display window of the GUI, the lane guidance panel preferably covers the lower portion of the navigation map from the bottom of the display window up to a boundary line based on the position of the road junction in the navigation map. The boundary line may correspond to the position of the split point, but preferably extends beyond the split point, e.g. to the highest extent of the road junction in the navigation map, as explained above. The boundary line, which acts as an edge between the lane guidance panel and the displayed navigation map, can be straight or curved, and preferably extends from one side of the display window to the other. In such embodiments, the lane guidance panel forms the lower portion of the GUI, while the (uncovered) navigation map forms the upper portion of the GUI.

The lane guidance panel generally comprises a (substantially rectangular) layer that is displayed on top of the navigation map. For example, the display on the display device may comprise a stack of layers with the lane guidance panel layer rendered on top of the map layer. The lane guidance panel may be partially transparent, such that at least some of the navigation map is visible under the panel. The level of transparency can, however, be selected as desired. In embodiments, the panel is at least partly opaque, so that the navigation map is not visible under the panel (at least in these areas), in order to avoid any visual conflicts between the lane guidance information displayed on the lane guidance panel and the underlying navigation map.

As will be appreciated, since the position of the lane guidance panel (and particularly the position of the boundary line thereof) is based on the position of the road junction in the navigation map, the displayed area of the lane guidance panel will change, typically decrease, as the navigation apparatus approaches the road junction. That is, the position of the lane guidance panel is dynamic, and the boundary line will move, e.g. towards the lower edge or bottom of the display, as the navigation apparatus approaches the road junction. The movement of the lane guidance panel is therefore based on the map geometry and reflects the progress of the vehicle towards the junction. For instance, as the navigation apparatus moves closer to the junction, the position of the junction, and hence the position of the boundary line of the lane guidance panel effectively moves towards the current position of the navigation apparatus on the display, and more of the navigation map is uncovered showing the continuation of the route after the junction. This may allow the user to look ahead and prepare for the next instruction (e.g. as in the normal navigation mode). Further, as the navigation apparatus moves past the split point, the lane guidance panel may naturally disappear, e.g. from the lower edge of the display. In this way, the user may be provided in a single consistent view with a more natural continuous display of the road situation before and after the junction.

The method further includes determining, and thus generating, data indicative of a second route line indicating the lanes, and preferably the individual one or more lanes, in which the user should be travelling so as to follow the determined route. The second route line may thus generally show the set of one or more lanes, and preferably the individual one or more lanes of the set of lanes, in which the user should be travelling so as to follow the determined route. These lanes may be referred to as "valid" lanes, and in general a lane may be determined to be a valid lane for the determined route according to various suitable criteria. For example, a lane may be deemed valid so long as a vehicle following that lane for a certain forward distance is able to safely continue along the determined route (for instance, a vehicle may be able to safely make one lane switch every e.g. 400 m). Thus, as the vehicle approaches the junction, the set of valid lanes may be restricted, e.g. until eventually only the exit lane(s) is valid. In other embodiments, the set of valid lanes may be essentially fixed, so that only the lanes that would ultimately allow the user to continue along the determined route are considered valid (e.g. only the outermost lane(s) adjacent to an exit lane).

The data is used to display the second route line at least in the lane guidance panel. The data indicative of the second route line may be generated substantially at the same time as, e.g. in a single step, as the data indicative of the lane guidance panel is generated. However, generally, the second route line and the lane guidance panel are generated as different layers that are then stacked with the second route line on top to provide the desired visualisation. Thus, the second route line is generally displayed on top of the lane guidance panel, which is turn is displayed on top of the navigation map.

As will be appreciated, the second route line may be generated from digital map data, e.g. as used to generate the first route line and the navigation map. In general, the second route line may be generated based on the first route line. (Particularly, the second route line may be generated based on, or using, substantially the same data used to generate the first route lane.) The second route line may thus be generated so that the position and geometry of the second route line generally follows that of the first route line, and hence of the determined route. For example, in a preferred embodiment, the centreline of the second route line will substantially match the centreline of the first route line. It will thus be appreciated, the position of the second route line may be generated based on data indicative of the determined route, e.g. as calculated by the navigation apparatus or as received over a communications link from a remote server. As will be appreciated, the second route line, as with the navigation map and the first route line, may be generated from digital map data, since the second route line will also need to follow the geometry of the road or roads of the road network displayed in the navigation map forming the determined route. Thus, in embodiments, the lane guidance information is presented to the user within the context of the map, based on the actual road geometry and (centred) based on the current position of the navigation apparatus along the determined route.

In general, the position (and geometry) of the second route line may be determined based on the map data such that the second route line displayed on the lane guidance panel aligns with the continuation of the route into the navigation map. For example, the second route line may continue into the uncovered portion of the navigation map, in which case the second route line displayed on the lane guidance panel should align with the road segments showing the continuation of the route into the navigation map. In this case, the second route line may replace (or cover) the first route line, such that the second route line is displayed on the lane guidance panel and also on the uncovered portion of the navigation map. Thus, the second route line may replace the first route line, such that the second route line is superimposed over the lane guidance panel and the (uncovered) portion of the navigation map. That is, in embodiments, the second route line extends continuously from the lane guidance panel into the uncovered portion of the navigation map to show the continuation of the route beyond the junction. The second route line may thus show one or more roads to be taken to follow the determined route through the road network in the uncovered portion of the navigation map. In this case, the first route line may be temporarily hidden during the lane guidance mode. Alternatively, it is contemplated that the first route line may remain visible at least in the uncovered portion of the navigation map during the lane guidance mode to show the continuation of the route. In this case, the position of the second route line on the lane guidance panel may be determined to align with the position of the first route line in the uncovered portion of the navigation map (i.e. at the boundary line between the lane guidance panel and the uncovered portion of the navigation map), so that the second route line and first route line together show the continuation of the route from the lane guidance panel into the uncovered portion of the navigation map beyond the junction. Thus, in other embodiments, the second route line may be displayed only on the lane guidance panel. The second route line may be displayed in such a manner that the second route line displayed on the lane guidance panel connects with the first route line in the navigation map to provide a continuous visualisation of the route extending from the lane guidance panel into the uncovered portion of the navigation map. Accordingly, in embodiments, the second route line may be superimposed over the lane guidance panel and connect with a portion of the first route line (not covered by the lane guidance panel), e.g. at the boundary line between the lane guidance panel and the uncovered portion of the navigation map. It will be appreciated that because the first and second route lines are both generated based on essentially the same data reflecting the determined route, the first and second route lines generally will be aligned with each other. In this way, the user may be presented with a display of the set of valid lanes approaching the junction (on the lane guidance panel) and also a visualisation of the continuation of the route beyond the junction (in the uncovered portion of the navigation map).

In cases where the determined route continues into the portion of the navigation map that is covered by the lane guidance panel, the continuation of the route beyond the junction may also be visualised on the lane guidance panel. For example, this may be the case where the route involves a U-turn, or a loop, or an over/underpass.

Preferably, the full set of available lanes is visualised on the lane guidance panel, with the second route line indicating (e.g. highlighting) amongst the full set of available lanes the (sub)set of one or more lanes in which the user should be travelling so as to follow the determined route. Accordingly, in a preferred embodiment, the method further comprises generating, for display on the lane guidance panel, a lane image representing the lanes of the multi-lane roadway. The lane image may also show the exit roadway(s) at the road junction. The lane image is preferably a schematic representation of the lanes to show the number of lanes, and preferably the actual road markings (or expected road markings based on the roadway), and is preferably generated from the digital map data. The lane guidance panel may thus include a visualisation of the full set of available lanes, and an indication (e.g. in the form of the second route line) among the available lanes of the set of valid lanes.

The position of the lane image on the lane guidance panel is preferably based on the position of the first (and/or the second route line), since the lane image needs to align with the second route line, which in turn is based on the position of the first route line, as explained above. The lane image may thus follow the position and geometry of the first and/or second route line. The lane image may be centred based on the position of the first route line. Alternatively, the second route line may be centred, with the lane image extending generally sideways from the second route line. The combination of the lane image and second route line on the lane guidance panel provides the user information about the lanes of the multi-lane roadway, both immediately before and after the split point of the road junction, and the lanes of the exit roadway, together with an indication about the set of lanes in which the user should be travelling in order to follow the determined route.

The lane image generally reflects the actual lane situation in front of the user. The lane image may thus be dynamic, and may be updated to reflect the current lane situation based on the current position of the navigation apparatus along the route. The current lane situation may be obtained from the digital map data. For example, lanes may generally be visualised as substantially straight segments, e.g. extending from the bottom of the display to the boundary line. Any changes to the lane geometry between the current position of the navigation apparatus and the position of the road junction, such as a new lane merging onto the roadway, or an exit lane appearing, may also be visualised. For instance, lanes that merge onto, or exit from, the roadway may be visualised as the navigation apparatus travels along the route towards the junction e.g. by fading such lanes in/out of the lane image. The lane image may also generally show the geometry (e.g. curvature) of the lanes based on the map data. For example, if two lanes are merging into one, this may be illustrated appropriately on the lane image.

The area of the lane guidance panel can, in some embodiments, be the same as the lane image. In other embodiments, the lane image is smaller than the full area of the lane guidance panel with the lane image centred on the display based on the position of the first and/or second route line.

The second route line may simply indicate (e.g. highlight) the set of one or more lanes which are valid for the determined route. However, in embodiments, the second route line may also indicate a required lane manoeuvre or switch. For example, the second route line may be curved to indicate that the user should follow the curve and perform the required lane manoeuvre (e.g. in order to follow an exit lane).

In some embodiments, the lane in which the vehicle is currently travelling may be determined (e.g. using the current position of the navigation apparatus, optionally in combination with other information, such as may be obtained by an on-board sensor or camera). In this case, the lane guidance panel may thus be used to provide dynamic lane-level guidance. Accordingly, the present invention may further comprise determining the current lane of the multi-lane roadway in which the vehicle is travelling, and if travelling in the current lane does not allow the vehicle to continue travelling along the determined route, indicating on the lane guidance panel a lane manoeuvre required to continue along the determined route. Preferably, the lane manoeuvre is indicated using the (i.e. or a portion of the) second route line. For instance, the second route line may indicate not only the set of one or more lanes in which the user should be travelling to continue along the route, but also the lane in which the user is currently travelling, along with an indication of a required lane manoeuvre to continue travelling along the route. For example, the second route line may be curved, or may comprise a curved portion, to indicate that a user should follow the curve to move from the current lane to a valid lane or lanes. In this case, the valid lanes may be indicated at the end of the curved shape or curved portion of the second route line. The end of the second route line (i.e. showing the valid lanes) may then be continued into the uncovered portion of the navigation map, or aligned with the first route line in the uncovered portion of the navigation map, in order to provide a continuous visualisation of the extension of the route before/after the junction, as described above.

It will be appreciated that the lane guidance panel will generally cover the icon representing the current position of the navigation apparatus within the navigation map. Thus, in embodiments, an indicator may be generated for display on the lane guidance panel showing the current position of the navigation apparatus. For example, the indicator may comprise a straight line showing the current position of the navigation apparatus on the lane guidance panel (i.e. along the second route line). In other cases, especially where lane-level guidance is being provided, as discussed above, an icon may be generated for display on the lane guidance panel that represents the current lane position of the vehicle.

Various additional attributes associated with the roadway and/or the lanes may also be displayed on the lane guidance panel. For instance, it is contemplated that traffic information, including lane-level traffic (where such data is available), may also be displayed on the lane guidance panel.

In embodiments, the method of the present invention can further comprise calculating an alternate route to the destination. The alternate route may be calculated in any suitable manner, e.g. in accordance with one or more user specified criteria, such as the fastest route, the shortest route, the most fuel efficient route, excluding certain road stretches, including certain road stretches, etc. As will be appreciated, the one or more criteria used to determine the alternate route will be different from the one or more criteria used to determine the (main) route. When an alternate route differs from the main route at the road junction, e.g. the main route requires the user to carry on the multi-lane roadway at the junction and the alternate route requires the user to leave the roadway at the junction, or of course vice versa, the method can include generating, for display at least on the lane guidance panel, data indicative of a third route line showing the set of lanes in which the user should be travelling so as to follow the determined alternate route. The third route line is preferably presented in a different colour or style than the second route line, such that the user can easily differentiate between the two route lines. The third route line may be displayed only on the lane guidance panel, or may be extended onto the navigation map. Where the third route line is displayed only on the lane guidance panel, the alternative route may temporarily be hidden in the navigation map to avoid visual confusion.

Lane guidance may generally be provided until the split point of the junction is reached, after which point it is no longer possible to (safely) switch lanes to continue along the determined route. In embodiments, after the navigation apparatus has passed through the road junction, e.g. passed the split point of the junction, the lane guidance panel is no longer displayed, and preferably the navigation apparatus reverts to displaying the navigation map and first route line (i.e. in the manner before the approach to the road junction was determined). Accordingly, the method of the present invention preferably further comprises determining, from the current position of the navigation apparatus, that the navigation apparatus has passed the road junction, and reverting to providing the data indicative of the navigation map and the first route line to the display device for display thereon.

However, where multiple road junctions are provided in close proximity (e.g. less than 800 m, or less than 400 m, of each other), the navigation apparatus may remain in the lane guidance mode so that the lane guidance panel is still displayed, but with the position of the lane guidance panel shifted based on the position of the next junction. In such cases, where an exit is immediately followed (e.g. within 400 m) by another exit/instruction, the second route line will generally indicate only lanes for the first exit that the user can take to end up in the correct lane for the second exit/instruction.

In the lane guidance mode, the navigation map may generally show either a 2D or 3D representation, with the lane guidance panel rendered accordingly to give a corresponding 2D or 3D perspective. However, preferably, the navigation map shows a 3D representation, and the lane guidance panel is rendered from a 3D perspective (so that in the preferred embodiments the lane guidance panel comprises the foreground of the display, whereas the uncovered navigation map comprises the background). In embodiments, when the navigation map is a 2D representation of the world at the time when the navigation apparatus is determined to be at a second predetermined distance from the road junction, the navigation map may be changed to instead show a 3D representation, e.g. as described above in which the image is generated as though from an elevated camera with an acute pitch angle, i.e. between 0° and 90°, positioned behind the current position of the navigation apparatus so as to show a perspective view of the area around the apparatus. The second predetermined distance may be the same as the first predetermined distance (used to trigger the generation of the lane guidance panel), or may be greater than the first predetermined distance. In such embodiments, the navigation map transitions from the 2D representation to the 3D representation before the lane guidance panel is generated (and displayed over the navigation map). After passing through the road junction, and after the lane guidance panel has been removed from the display, the navigation map can transition back from the 3D representation to the 2D representation.

In the method of the present invention, data of the graphic user interface is provided to a display device of the navigation apparatus to cause the display of the GUI thereon. When the method is performed on the navigation apparatus, the method may further comprise displaying the graphic user interface on the display device. In other embodiments, however, such as when the method is performed on a server, or the display device is remote from the apparatus performing the invention, said providing can comprise transmitting the data indicative of the GUI over a communications link, which may be wired or wireless.

The principles of the present invention are applicable to any form of navigation apparatus, or indeed any location-aware mobile device. In accordance with any of the aspects or embodiments of the invention the apparatus may comprise a display for displaying a digital map to a user, a processor configured to access electronic map data and cause an electronic map to be displayed to a user via the display, and typically a user interface operable by a user to enable the user to interact with the apparatus. References to a processor may refer to a set of one or more processors. Thus, it will be appreciated that the navigation apparatus may comprise a set of one or more processors for carrying out any of the steps described. For example, the "means for" carrying out any of the steps may be a set of one or more processors.

Regardless of its implementation, a navigation apparatus used in accordance with the present invention may comprise a processor, memory, and electronic map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include Global Navigation Satellite Systems (GNSS), such as GPS, signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In embodiments of the invention, the navigation apparatus is a mobile navigation apparatus, also referred to as a portable navigation device (PND). In embodiments the navigation apparatus is located in a vehicle. The current location of the navigation apparatus will therefore correspond to the current location of the user/driver and/or vehicle, as appropriate. The invention is also applicable to navigation apparatus which is provided as part of an integrated navigation system. For example the apparatus may form part of an in-vehicle integrated navigation system.

In other embodiments, the navigation apparatus may be implemented by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

The present invention extends to a computer program product comprising computer readable instructions executable to perform a method according to any of the aspects or embodiments of the invention, or to cause a navigation apparatus to perform such methods.

The present invention extends to a, preferably non-transitory, computer program product comprising computer readable instructions executable when run on a navigation apparatus in accordance with any of the embodiments of the invention to cause a set of one or processors of the navigation apparatus to perform the steps of any of the aspects or embodiments of the method described herein.

It will be appreciated that any of the further aspects of the invention may include any or all of the features of the invention described in relation to any other aspects and embodiments of the invention to the extent they are not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

FIG. 3 is a schematic diagram of an arrangement of mounting and/or docking an exemplary navigation device;

FIG. 4A shows an exemplary 2D guidance view as used in conventional navigation devices, and FIG. 4B shows an exemplary 3D guidance view as used in conventional navigation devices, FIG. 4C defines the respective pitch and view angles which may be used to describe such views;

FIGS. 9B and 9C showing the generation of the lane guidance panel; and FIG. 9D showing the completed transition;

DETAILED DESCRIPTION OF PREFERRED EMBODIMENTS

The description with respect to FIGS. 1 to 4 provides background information to facilitate understanding of the invention in its various embodiments. Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA) executing route planning and navigation software.

It will also be apparent from the following that the teachings of the present invention even have utility in circumstances where a user is not seeking instructions on how to navigate from one point to another, but merely wishes to be provided with a view of a given location or information about a current or upcoming location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
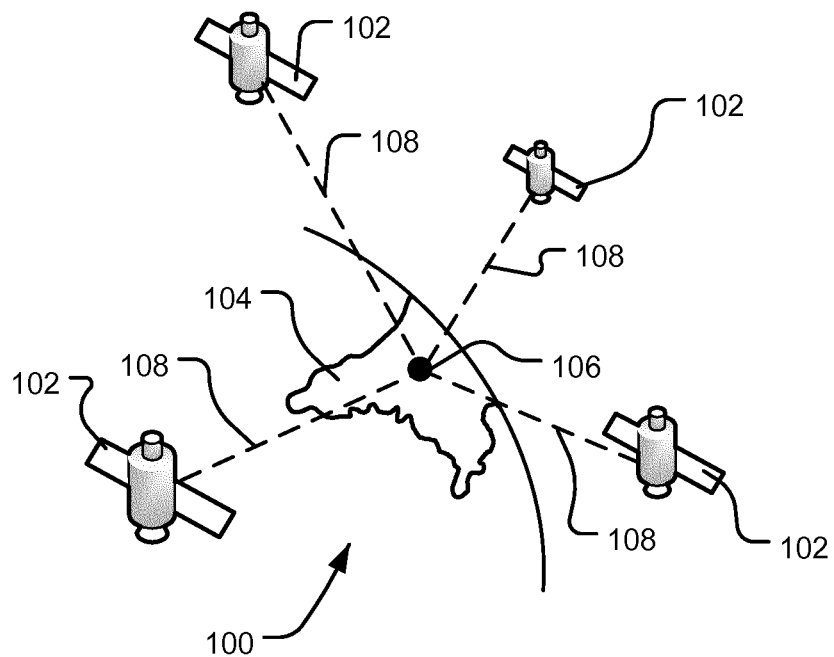
FIG. 1 is a schematic illustration of an exemplary part of a Global Positioning System (GPS) usable by a navigation device.

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100 and generally comprises a plurality of satellites 102 are in orbit about the earth 104. The orbit of each satellite 102 is not necessarily synchronous with the orbits of other satellites 102 and, in fact, is likely asynchronous. A GPS receiver 106 is shown that receives GPS data as spread spectrum GPS satellite signals 108 from the various satellites 102. The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

Figure 2:
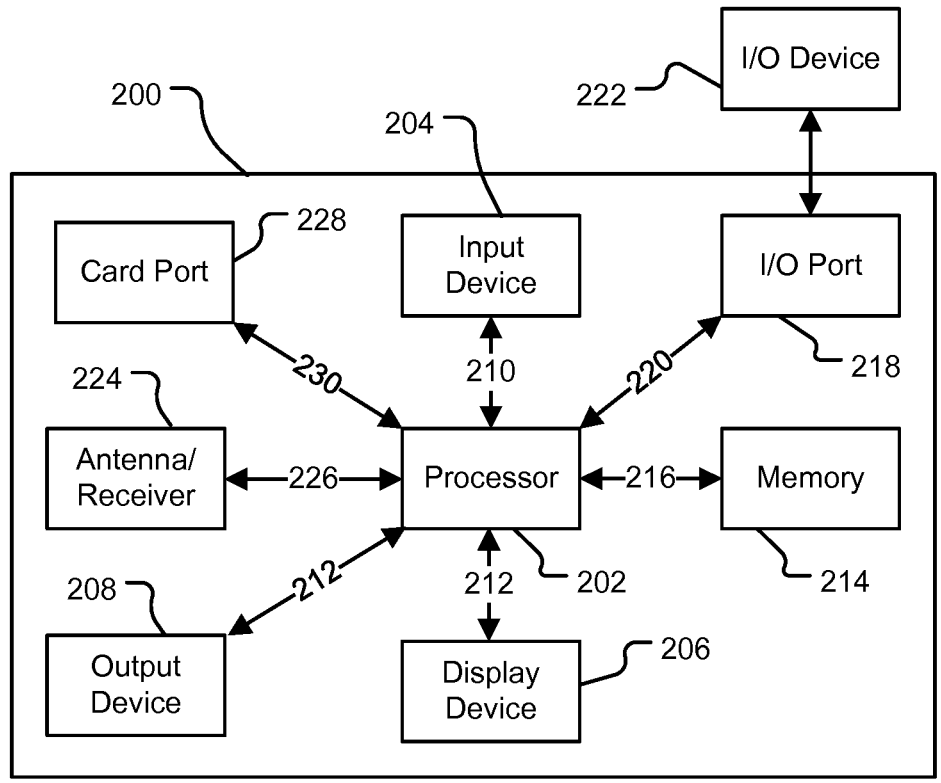
FIG. 2 is a schematic illustration of electronic components of an exemplary navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of a display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Referring now to FIG. 3, the navigation device 200 may be a unit that includes an integrated input and display device 250 and the other components of FIG. 2 (including, but not limited to, the internal GPS receiver 224, the processor 202, a power supply (not shown), memory systems 214, etc.). The navigation system 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

The navigation device 200 may generally establish a "mobile" or telecommunications network connection with a server via a mobile device (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server. As such, a "mobile" network connection is established between the navigation device 200 (which can be, and often times is mobile as it travels alone and/or in a vehicle) and the server to provide a "real-time" or at least very "up to date" gateway for information. The establishing of the network connection between the mobile device (via a service provider) and another device such as the server, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

The navigation device 200 may communicate with the server via a generic communications channel that can be implemented by any of a number of different arrangements. The server and a navigation device 200 can communicate when a connection via communications channel is established between the server and the navigation device 200 (noting that such a connection can be a data connection via mobile device, a direct connection via personal computer via the internet, etc.).

The server may include a processor operatively connected to a memory and further operatively connected, via a wired or wireless connection, to a mass data storage device. The processor is further operatively connected to transmitter and receiver, to transmit and send information to and from navigation device 200 via communications channel. The signals sent and received may include data, communication, and/or other propagated signals. The transmitter and receiver may be selected or designed according to the communications requirement and communication technology used in the communication design for the navigation system 200. Further, it should be noted that the functions of transmitter and receiver may be combined into a signal transceiver.

The server is further connected to (or includes) a mass storage device, noting that the mass storage device may be coupled to the server via communication link. The mass storage device contains a store of navigation data and map information, and can again be a separate device from the server or can be incorporated into the server.

The navigation device 200 is adapted to communicate with the server through communications channel, and includes processor, memory, etc. as previously described with regard to FIG. 2, as well as transmitter and receiver to send and receive signals and/or data through the communications channel, noting that these devices can further be used to communicate with devices other than server. Further, the transmitter and receiver are selected or designed according to communication requirements and communication technology used in the communication design for the navigation device 200 and the functions of the transmitter and receiver may be combined into a single transceiver.

Software stored in server memory provides instructions for the processor and allows the server to provide services to the navigation device 200. One service provided by the server involves processing requests from the navigation device 200 and transmitting navigation data from the mass data storage to the navigation device 200. Another service provided by the server includes processing the navigation data using various algorithms for a desired application and sending the results of these calculations to the navigation device 200.

The communication channel generically represents the propagating medium or path that connects the navigation device 200 and the server. Both the server and navigation device 200 include a transmitter for transmitting data through the communication channel and a receiver for receiving data that has been transmitted through the communication channel.

The communication channel is not limited to a particular communication technology. Additionally, the communication channel is not limited to a single communication technology; that is, the channel may include several communication links that use a variety of technology. For example, the communication channel can be adapted to provide a path for electrical, optical, and/or electromagnetic communications, etc. As such, the communication channel includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel can include intermediate devices such as routers, repeaters, buffers, transmitters, and receivers, for example.

In one illustrative arrangement, the communication channel includes telephone and computer networks. Furthermore, the communication channel may be capable of accommodating wireless communication such as radio frequency, microwave frequency, infrared communication, etc. Additionally, the communication channel can accommodate satellite communication.

The communication signals transmitted through the communication channel include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel. These signals may be modulated, encrypted and/or compressed signals as may be desirable for the communication technology.

The server may include a remote server accessible by the navigation device 200 via a wireless channel. The server may include a network server located on a local area network (LAN), wide area network (WAN), virtual private network (VPN), etc.

The server may include a personal computer such as a desktop or laptop computer, and the communication channel may be a cable connected between the personal computer and the navigation device 200. Alternatively, a personal computer may be connected between the navigation device 200 and the server to establish an internet connection between the server and the navigation device 200. Alternatively, a mobile telephone or other handheld device may establish a wireless connection to the internet, for connecting the navigation device 200 to the server via the internet.

The navigation device 200 may be provided with information from the server via information downloads which may be periodically updated automatically or upon a user connecting navigation device 200 to the server and/or may be more dynamic upon a more constant or frequent connection being made between the server and navigation device 200 via a wireless mobile connection device and TCP/IP connection for example. For many dynamic calculations, the processor in the server may be used to handle the bulk of the processing needs, however, processor 210 of navigation device 200 can also handle much processing and calculation, oftentimes independent of a connection to a server.

As indicated above in FIG. 2, a navigation device 200 includes a processor 202, an input device 204, and a display screen 206. The input device 204 and display screen 206 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 204 and/or any additional output device 208, such as audio input/output devices for example.

The display device 250 of the navigation device 200 generally provides navigation guidance information to the user, e.g. as shown in FIG. 4A, which shows a 2D navigation guidance view in which the determined route being followed is shown by a route line 403 superimposed on top of the map, with the current position of the navigation device 200 on the map (and along the route) shown by icon 401. FIG. 4B shows a similar 3D navigation guidance view where again the determined route being followed is shown by a route line 407, and the current position of the navigation device 200 is reflected by an icon 405.

Figure 5:
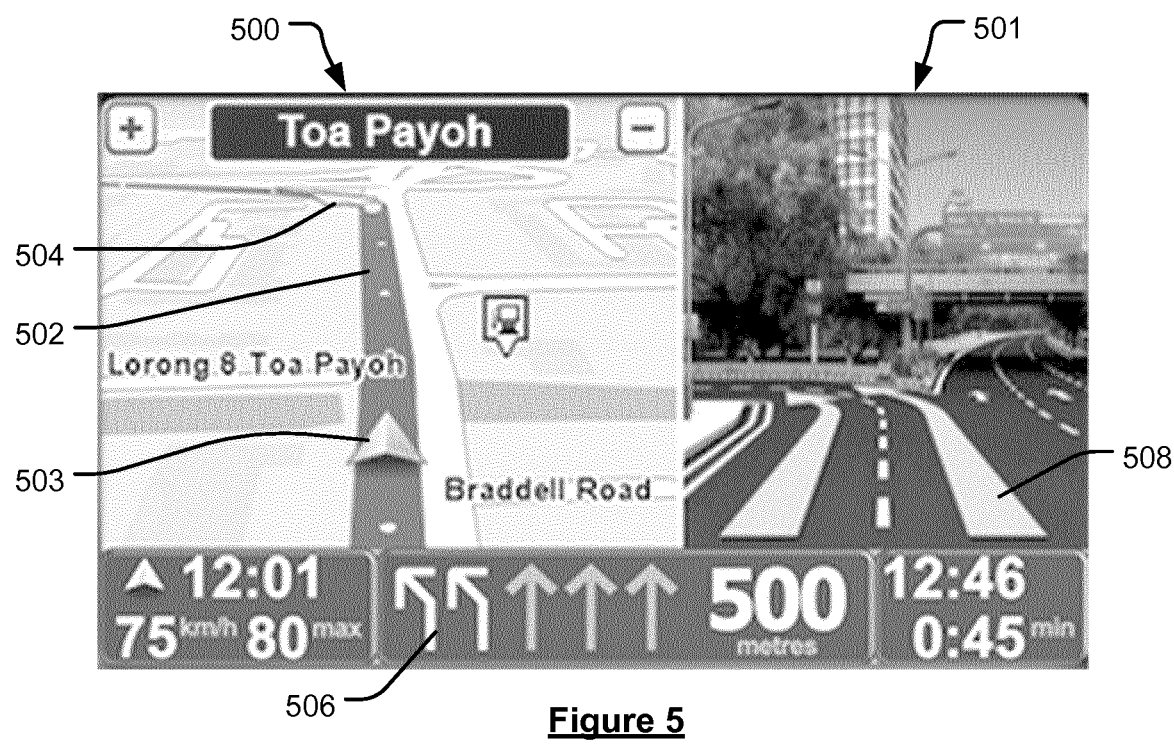
FIG. 5 shows a combination of a 3D guidance view together with a schematic view of an approaching junction that can be used for complex junctions in conventional navigation devices.

FIG. 5 shows an example of a known display for a navigation device approaching a complex junction. As shown, the display includes a guidance view 500, similar to that shown in FIG. 4B, displaying the route to be followed (indicated by the route line 502), the current position of the device (indicated by the icon 503), and the manoeuvre that is to be made at the next junction (arrow 504). The display also includes a separate junction view 501 wherein the arrows 508 indicate which lanes of the road the user needs to be in to complete the desired manoeuvre (i.e. "lane guidance"). The guidance view 500 and the junction view 501 are presented to the user simultaneously in a side by side manner. The guidance view 500 is updated as the navigation device moves along the route. However, the junction view 501 is essentially static, i.e. is not updated as the navigation device moves towards the junction. The junction view 501 is therefore essentially independent of both the guidance view 500 and the actual position of the navigation device relative to the junction and may not therefore accurately reflect the current road conditions in front of the user. The user is thus presented with two different views, which contain potentially visually conflicting information. This information may therefore be difficult for the user to accurately process.

According to the techniques presented herein, such lane guidance information may be presented to the user as they approach a complex road junction on a multi-lane roadway in a clearer and more intuitive manner in order to reduce the risk of visual confusion for the user, and hence ultimately reduce the risk of driver error. In particular, according to the techniques presented herein, lane guidance information may be displayed to a user approaching a road junction on a dynamic lane guidance panel that covers a portion of the navigation map, the extent of which is determined based on the position of the road junction in the map. Particularly, where the display is such that the current position of the navigation apparatus is represented at the bottom of the display screen, i.e. so that the route continues from the bottom of the display towards the top, the lane guidance panel covers the lower portion of the navigation map between the current position of the navigation apparatus (i.e. the lower edge of the display) and the position of the road junction. Thus, the user may be presented with the desired lane guidance information in the lower half of the display, whilst the continuation of the map beyond the junction may still be visualised in the upper half of the display. In this way, the lane guidance information is presented to the user in a more natural way within the context of the map.

Figure 6A:
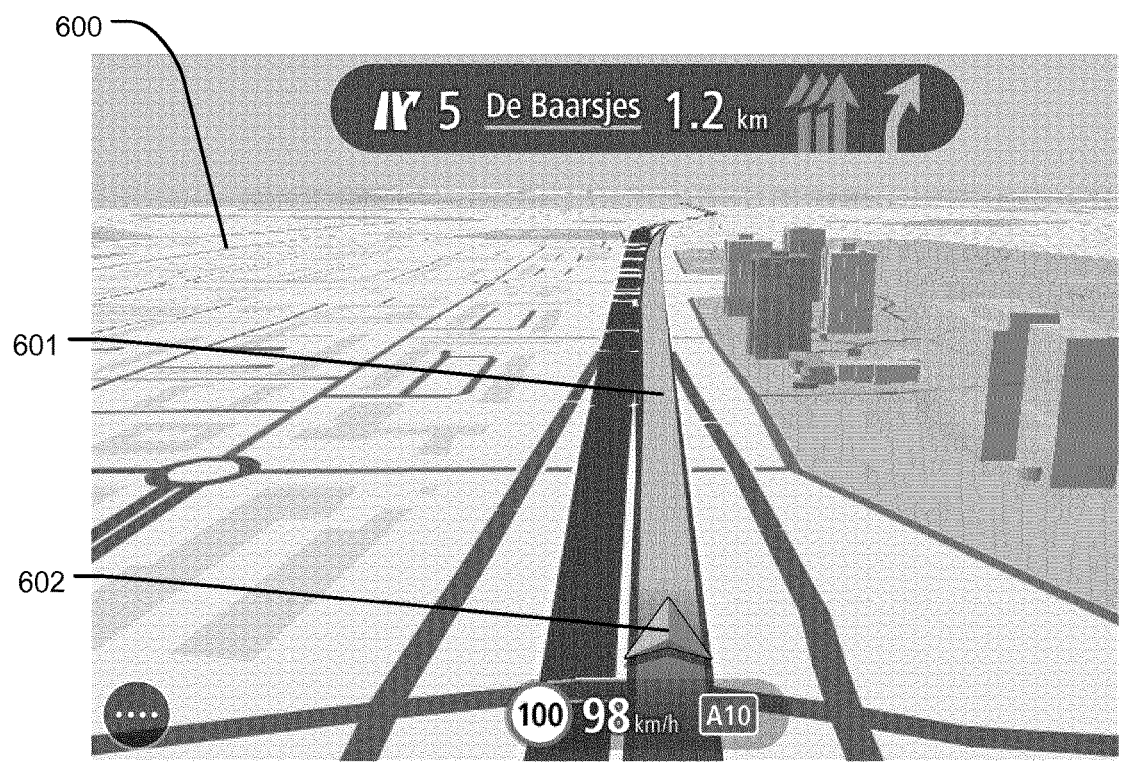
FIGS. 6A-6D show an example of a display in accordance with embodiments of the present invention that may be used to provide lane guidance information to a user approaching a junction along the route depicted in FIG. 6E.
Figure 6B:
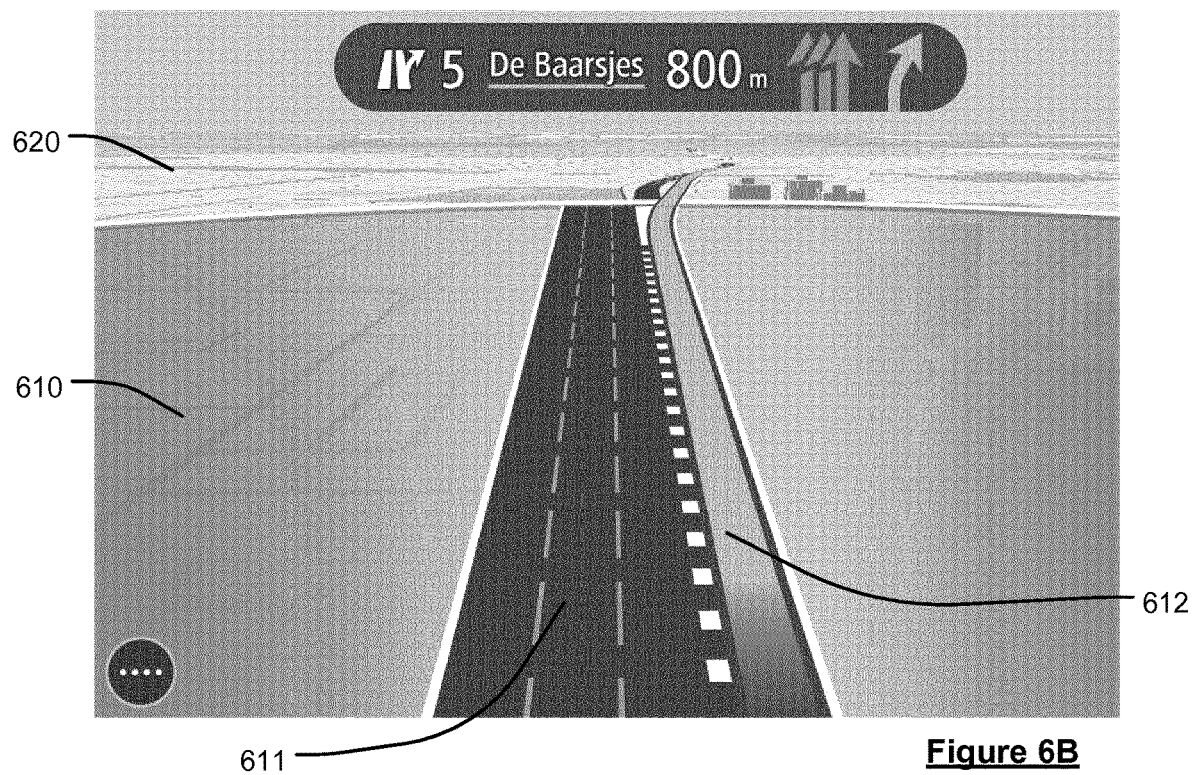
Figure 6C:
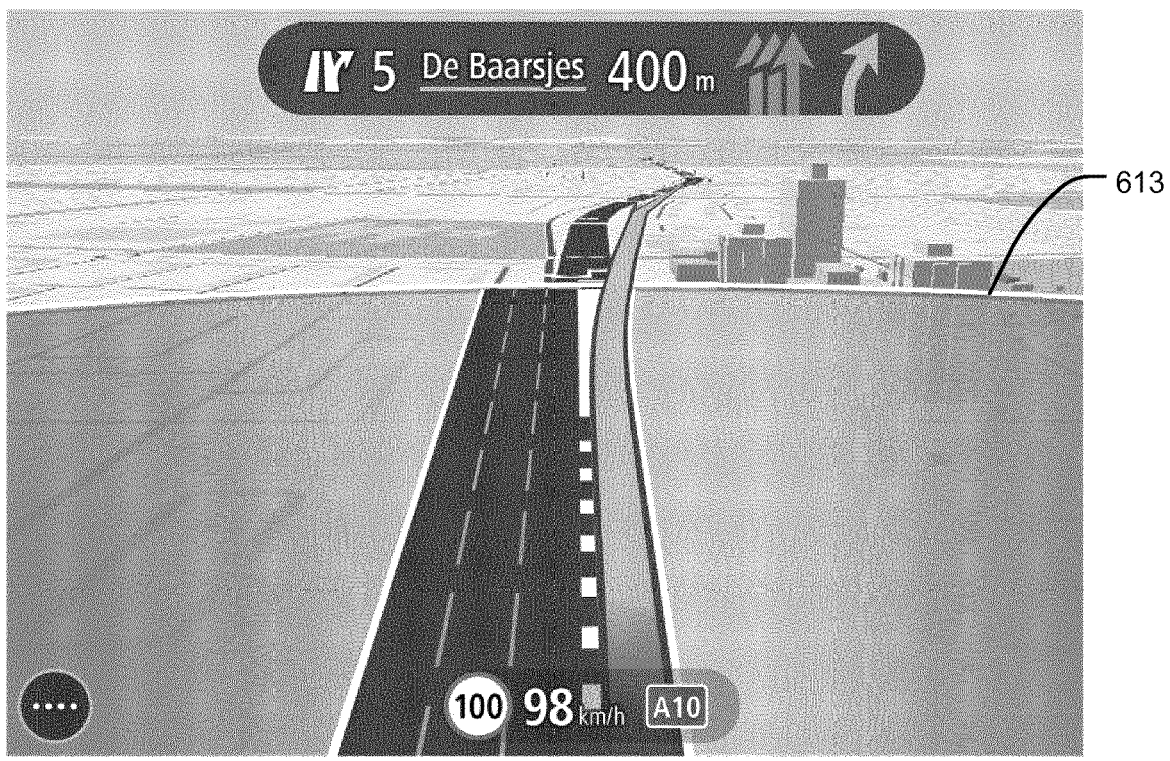
Figure 6D:
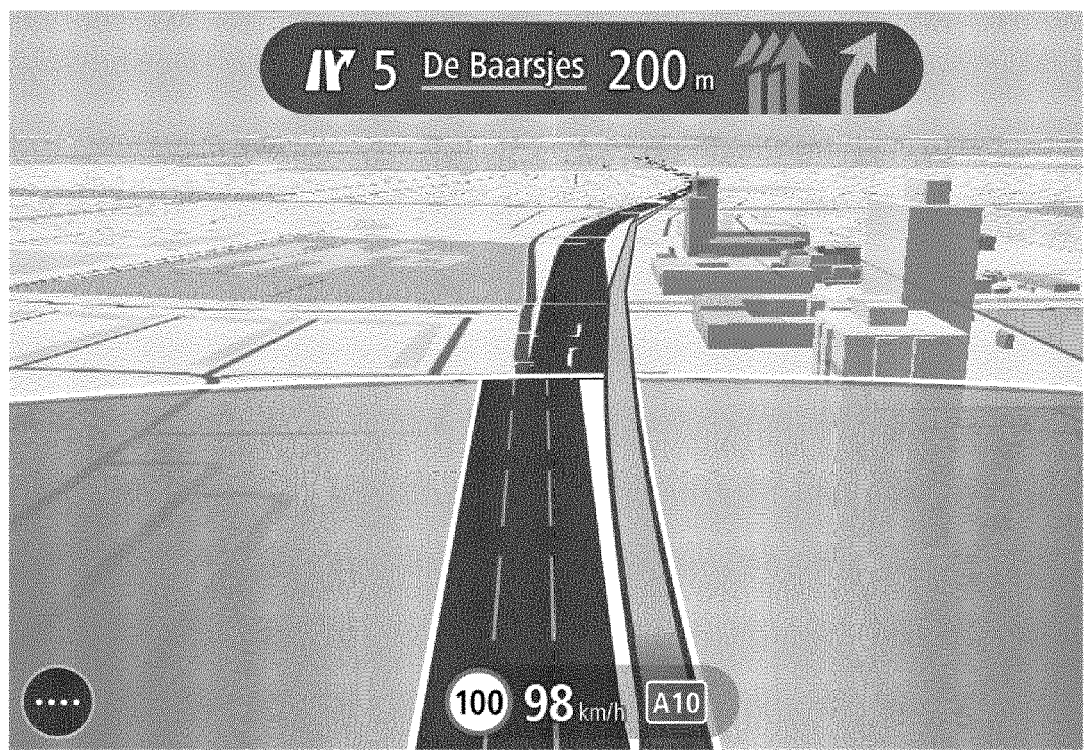
Figure 6E:
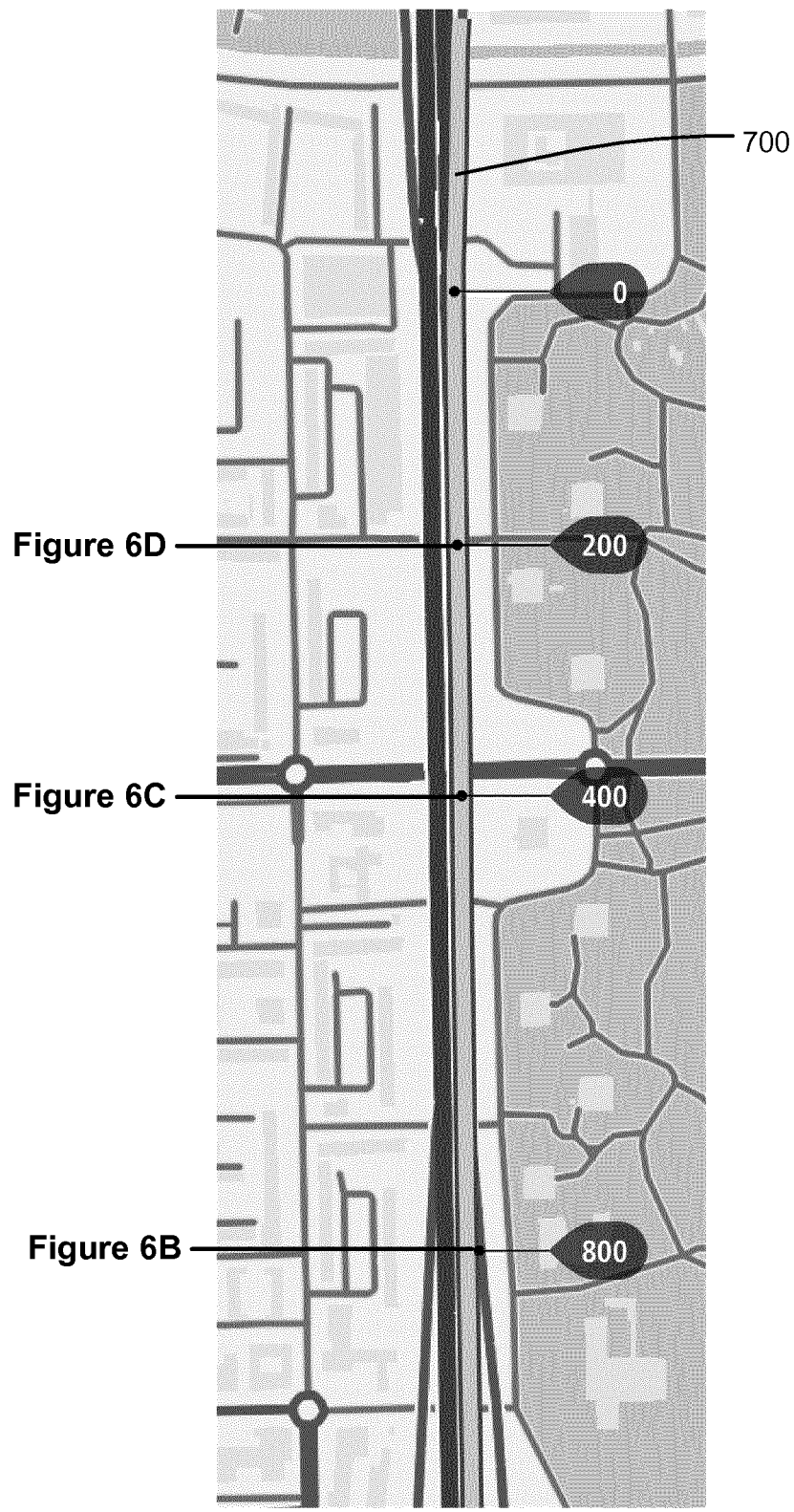

An example of the techniques presented herein will now be described in relation to FIGS. 6A-6E which show schematically the evolution of the display (e.g. a GUI) of a navigation device approaching a junction along a multi-lane roadway, and specifically as the navigation device is travelling towards a junction along a determined route 700 as indicated in FIG. 6E. However, it will be appreciated that the techniques presented herein may generally be applied to any road situation wherein lane guidance may be desired.

FIG. 6A illustrates the view prior to determining that the navigation device is approaching a junction i.e. during normal navigation mode, wherein the display shows the normal navigation view (e.g. as in FIG. 4B) comprising a first route line 601 indicating the route along which the vehicle should travel to follow the determined route 700 through the navigation map 600 displayed together with an icon 602 showing the current position of the vehicle within the navigation map.

However, once it is determined that the navigation device (and hence vehicle) is approaching a junction, for instance, that the navigation device is at a predetermined threshold distance of the road junction (which in this case is 800 m, although may be selected as desired depending on the road junction and/or the user's preferences), so that lane guidance information may be required, the view is modified to include the required lane guidance information. That is, upon determining that the navigation device is approaching a road junction where lane guidance may be required, the display switches to a lane guidance mode wherein lane guidance advice is displayed. In particular, during the lane guidance mode, a lane guidance panel 610 is generated for display on top of the navigation map 600 wherein the lane guidance panel 610 shows the current lane situation ahead of the user and the lane (or lanes) in which the vehicle should be travelling to continue along the determined route 700. Thus, FIG. 6B shows the display at position 'B' along the determined route 700 shown in FIG. 6E, 800 m ahead of the road junction. As shown in FIG. 6B, displayed on the lane guidance panel 610 is a lane image 611 showing the current lane situation ahead of the vehicle and a second route line 612 indicating the lane(s) in which the vehicle should be travelling in order to continue along the determined route. The extent of the navigation map 600 that is covered by the lane guidance panel 610 is generally based on the position of the road junction and the uncovered portion 620 of the navigation map 600 thus shows the continuations of the map beyond the road junction. The user may thus be presented in a single consistent view with both the lane guidance information before the road junction (on the lane guidance panel) and also the continuation of the route into the uncovered portion 620 of the navigation map 600.

The lane image 611 shows the lane situation between the current position of the navigation device and the (split point of) the junction including, e.g. the number of lanes, the lane geometry, and the nature and position of the lane dividers. The lane image 611 provides a visualisation of the current lane situation essentially reflecting the (real world) lane situation that is visible to the user through the windscreen of their vehicle. The lane image 611 is thus updated as the navigation device moves along the determined route within the navigation map towards the split point of the junction. Thus, any new lanes merging onto the roadway, any lanes that split or merge, or any additional (e.g. exit) lanes that appear along the roadway, may be visualised e.g. by fading the lanes in/out with a suitable extension—for instance, new lanes may be faded in, or diverging lanes may be faded out, with an extension of 200 m, so that the lane image essentially reflects the lane situation along the next 200 m of the roadway. The data needed to generate the lane image 611 generally includes the road centrelines (to give the road geometry); the number of lanes; the lane connectivity; and the divider types, which information is generally obtainable from the map data. As shown in FIG. 6B, the lanes are generally visualised on the lane guidance panel 611 as substantially straight segments extending from the bottom of the display to a boundary line 613 at the upper edge of the lane guidance panel 610. The geometry (e.g. curvature) of the lanes is also generally visualised. For example, as shown best in FIGS. 6C and 6D, the curvature of the exit lane which the user is instructed to follow is shown in the lane image 611.

The second route line 612 indicates on the lane image 611 the set of valid lanes (among the full set of lanes) in which the vehicle should be travelling so as to continue along the determined route. In general, a lane may be determined to be a valid lane for the determined route according to various suitable criteria. For example, a lane may be deemed valid so long as a vehicle following that lane for a certain forward distance is able to safely continue along the determined route. For instance, a vehicle may be able to safely make one lane switch every e.g. 400 m. For example, the second route line 612 may show on the lane image 611, e.g. by highlighting in a first colour or style, the set of valid lanes amongst the full set of lanes (which may be displayed in the a different colour, e.g. corresponding the colour of the roadways in the navigation map 600, for consistency). For visual consistency the second route line 612 may be visualised in the same way as the first route line 601 used during the normal navigation guidance mode, as shown in FIG. 6A. Alternatively, the second route line 612 may be visualised differently to the first route line 601, e.g. so as to indicate that the display is currently in lane guidance mode.

The position (and geometry) of the second route line 612, and hence of the lane image 611, is determined in a similar manner to, or based on the position of, the first route line 601 so that the second route line 612 generally follows the road geometry of the determined route 700. In this way, the second route line 612 may thus be generally aligned with the continuation of the route 700 into the uncovered portion 620 of the navigation map 600. The second route line 612 may thus extend continuously from the lane guidance panel 610 into the uncovered portion 620 of the navigation map 600 in order to merge the lane guidance view presented on the lane guidance panel 610 with the schematic map view in the uncovered portion 620 of the navigation map 600. In this case the first route line 601 may be temporarily replaced, or hidden, during the lane guidance mode. Alternatively, the first route line 601 may remain visible at least in the uncovered portion 620 of the navigation map 600 during the lane guidance mode. In this case, the second route line 612 may be displayed only on the lane guidance panel 610 and arranged to align and connect with the first route line 601 at the boundary line 613 at the upper edge of the lane guidance panel 610 so that the continuation of the route from the lane guidance panel 610 into the uncovered portion 620 of the map is still visualised.

The view may generally be centred on the second route line 612 (and hence also the first route line 601). The lane image 611 is therefore also generally centred on the display since the lanes depicted in the lane image 611 may generally be visualised as sideways extensions of the second route line 612. In this way, the lane guidance information presented on the lane guidance panel 610 is displayed in a manner that is visually consistent with the uncovered portion of the navigation map 600 and reflects the actual road situation. In general, it will be appreciated that the positions of the lane image 611 and the second route line 612 are thus determined based on data indicative of the determined route, e.g. as calculated by the navigation device, similarly to the first route line 601.

Figure 7:
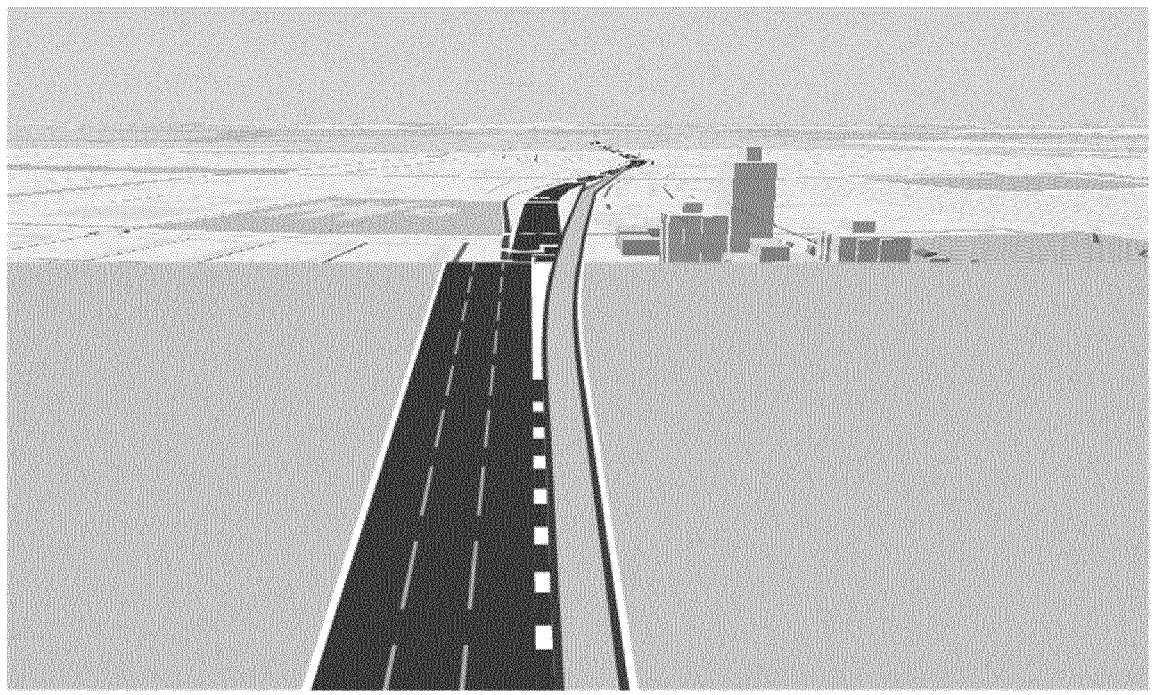
FIG. 7 illustrates an alternative example of a display wherein a straight boundary line is displayed (in contrast to the curved boundary line of FIGS. 6A-6D)

As previously mentioned, the lane guidance panel generally extends from the bottom of the display up to a boundary line 613 that extends from one side of the display to the other and demarks the lane guidance panel 610 from the uncovered portion 620 of the navigation map 600. The boundary line 613 may be curved, as shown in FIGS. 6B-6D, or may be straight (as shown in FIG. 7). The position of the boundary line 613, and hence the extent of the lane guidance panel 610, is set based on the position of the road junction in the navigation map 600 so that the lane guidance panel 610 covers the portion of the navigation map including the route leading up the road junction (i.e. so that lane guidance information is provided for the portion of the route before the road junction). Depending how far in advance of the road junction the lane guidance panel 610 is displayed, the lane guidance panel 610 may at least initially fill the display. However, generally, a portion of the navigation map 600 will be uncovered. The uncovered portion 620 of the navigation map 600 remains visible in the background of the image and shows the continuation of the navigation map 600 beyond the junction (i.e. beyond the boundary line 613).

Preferably, the position of the boundary line 613 is determined based on the highest extent of the junction in the navigation map 600. It will be appreciated that this is typically located slightly beyond the split point associated with the junction, i.e. the point by which the user must be in a valid lane in order to continue along the determined route. The highest extent of the junction may for example be determined by calculating a convex hull for the junction, wherein the convex hull is a convex polygon enclosing the junction which may be computed in the projection plane as a counter-clockwise sequence of corner points which may be joined by straight line segments. The input points for the convex hull computation may for example be collected by traversing over all generated paths and offsetting the path centreline to the right and to the left by half the lane width. This convex hull may be used to quickly compute the highest point of the junction in the 3D guidance view so that the boundary line 613 may be set accordingly. Generally, the convex hull will be generated only once, i.e. when the navigation device is determined to be within a predetermined distance of the complex junction so that lane guidance information is required, and need not be updated as the navigation device moves towards the road junction. However, it will be appreciated that various other suitable techniques may be used for setting the position of the boundary line 613 appropriately. For example, the highest point of the junction could be determined on the fly by repeatedly iterating over all coordinates of the junction within each rendered frame, although this would typically be more computationally expensive.

It will be appreciated that because the extent of the lane guidance panel 610 is determined based on the position of the road junction within the navigation map, the position of the lane guidance panel 610 will change, i.e. decrease, as the navigation device approaches the junction, so that increasingly more of the navigation map 600 beyond the junction is uncovered. Particularly, the position of the boundary line 613 between the lane guidance panel 610 and the background navigation map 600 moves towards the bottom of the display as the navigation device gets closers to the junction. Thus, as shown in FIG. 6C, which shows the display 400 m ahead of the junction, e.g. at point 'C' along route 700 as illustrated in FIG. 6E, the position of the boundary line 613 has moved toward the lower edge of the display (compared to FIG. 6B), reflecting the movement of the navigation apparatus towards the vehicle. Similarly, FIG. 6D shows the display 200 m ahead of the junction, e.g. at point 'D' along the determined route 700 illustrated in FIG. 6E, where the position of the boundary line 613 has moved even further towards the bottom of the display. As the user arrives at, and moves beyond, the junction the lane guidance panel 610 therefore naturally moves out of the bottom of the display to return the view to the normal navigation guidance view.

Figure 8:
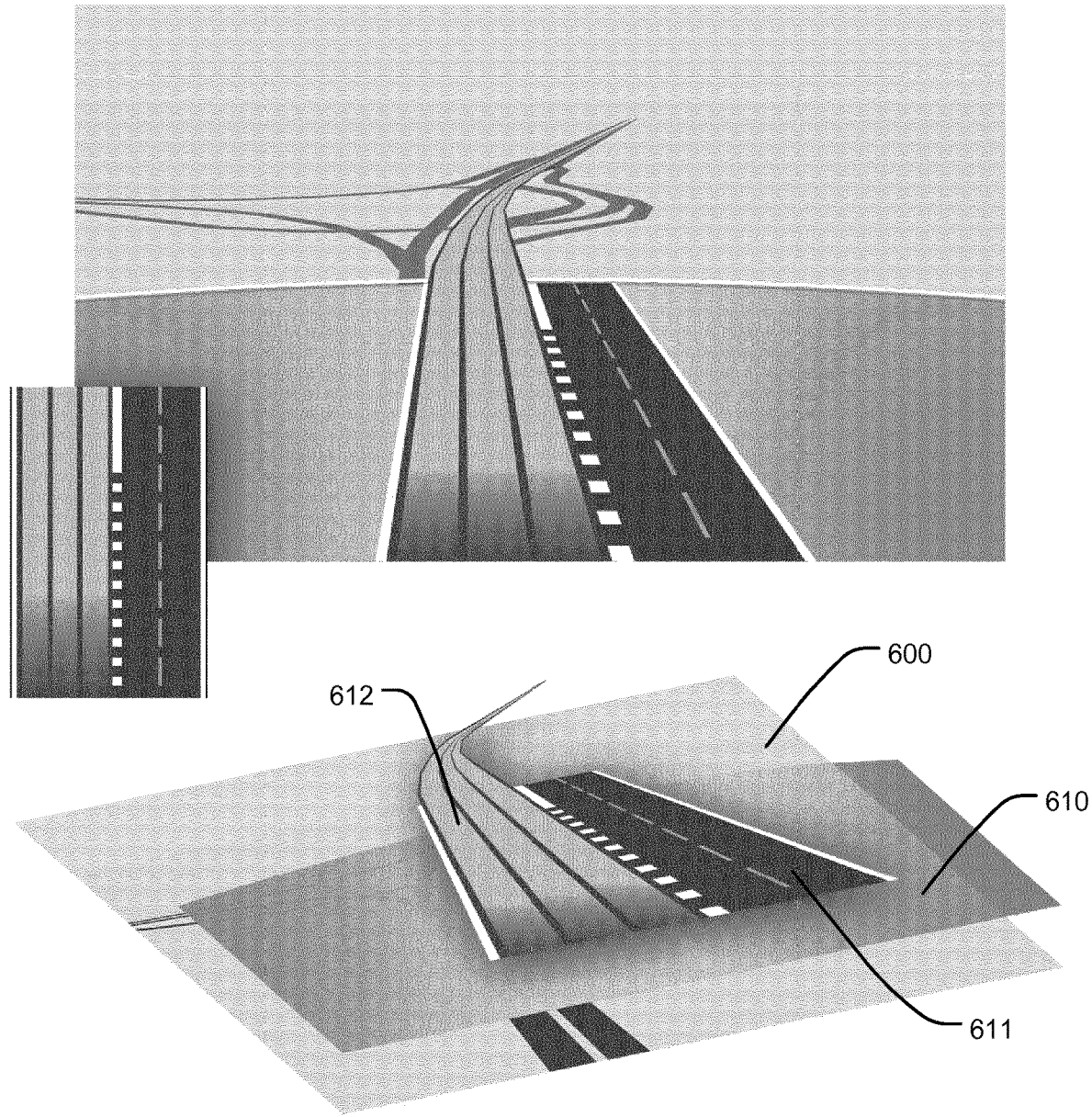
FIG. 8 shows schematically how a display may be generated by stacking multiple layers within the display image.

The lane guidance panel 610 comprises a generally rectangular layer that is generated on top of the navigation map 600 so as to cover a portion thereof. FIG. 8 shows schematically how the display may be built up as a stack of layers. Particularly, as shown in FIG. 8, the lane guidance panel 610 may be rendered and stacked on top of the navigation map 600, with the lane image 611 and second route line 612 being stacked on top of the lane guidance panel 610. The lane guidance panel 610 may be partially transparent, such that at least some of the navigation map 600 is visible under the panel. The level of transparency can, however, be selected as desired and in some cases the lane guidance panel is at least partly opaque, so that the navigation map is not visible under the panel, in order to avoid any visual conflicts between the lane guidance information displayed on the lane guidance panel and the underlying navigation map. The lane image 611 also shows lane divider markings that may be provided to help more clearly visualise the lanes, and particularly the valid lane(s) 612 in which the user should be travelling. The lane divider markings may be provided as part of the lane image 611, as shown in FIG. 8, or may be provided as a further layer that is stacked on top of the second route line 612. Indeed, it will be appreciated that FIG. 8 merely shows one example of how the display may be generated and that various other techniques may suitably be used. For instance, the lane image 611 and the second route line 612 displayed on the lane guidance panel 610 may alternatively be generated in a single step, e.g. in the same layer as the lane guidance panel 610, which is then displayed on top of the navigation map.

In FIG. 8, the second route line 612 continues into the uncovered portion 620 of the navigation map 600 to indicate the continuation of the determined route 700 beyond the road junction, e.g. to help the user prepare for the next instruction after passing the junction. In this case, as explained above, the first route line 601 may be temporarily hidden, and replaced, by the second route line 612. However, as also mentioned above, it is also contemplated that the second route line 612 may be generated for display only on the lane guidance panel 610, in which case the second route line 612 may be arranged so as to align and connect with the first route line 601 in the uncovered portion 620 of the navigation map 600 in order to provide a smooth, continuous visualisation of the extension of the route beyond the junction, i.e. from the valid lane(s) 612 as indicated on the lane guidance panel 610 onto the road segments in the map 600.

Thus, the lane guidance panel 610 is used to display lane guidance advice to the user as the navigation device approaches the road junction, whereas the continuation of the route 700 is simultaneously shown in the uncovered portion of the navigation map 600. The second route line 612 (optionally in combination with the first route line 601) is used to merge these two views. In this way, the user is presented in a single consistent view with both the lane guidance information that is required before the road junction and also a visualisation of the continuation of the route beyond the junction, thus allowing the user to look ahead into the navigation map to see the continuation of the route 700 and prepare for the next instruction. Furthermore, this information is presented in a natural order reflecting the upcoming road situation, e.g. from bottom to top, with the current lane situation presented at the bottom of the display, followed by any intermediate changes in the lane situation between the current position of the user and the road junction, an indication of the split point of the junction, and finally, at the top of the display, a visualisation of the continuation of the route into the background navigation map. It will be appreciated that, at least compared to FIG. 5, this information is presented in a more intuitive manner, with a reduced risk of visual confusion or conflict.

Figure 9A:
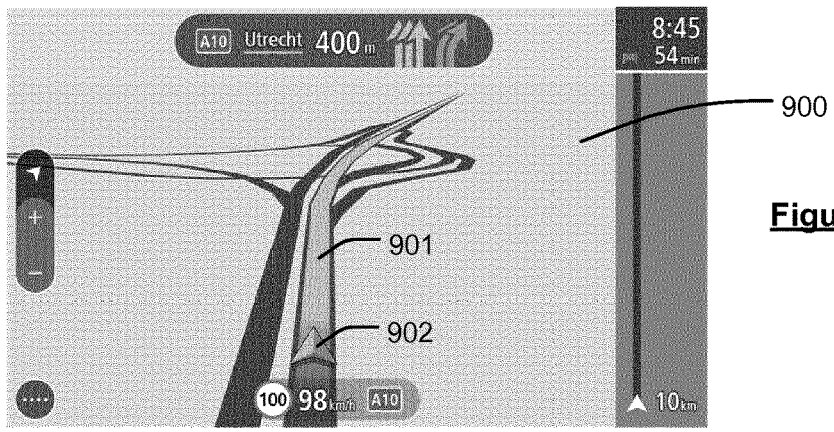
FIGS. 9A-9D illustrate a transition of the display into lane guidance mode with FIG. 9A showing the default navigational guidance view.
Figure 9B:
Figure 9C:
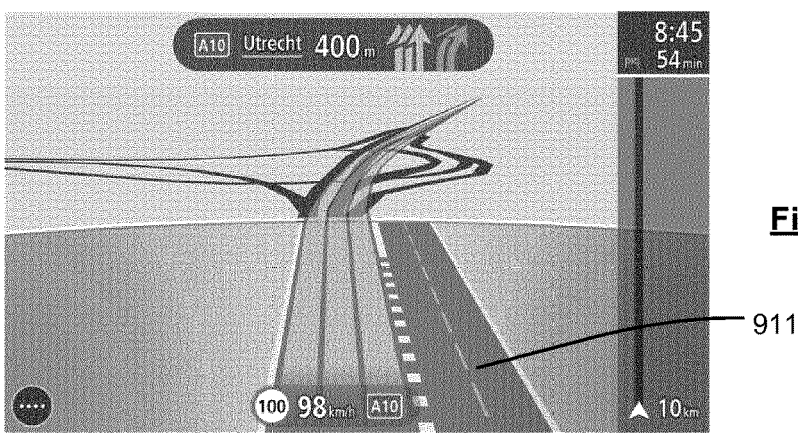
Figure 9D:

It will be appreciated that lane guidance information is generally only needed when the user is approaching a road junction. For instance, lane guidance information may be provided, by displaying a lane guidance panel as discussed above, when the user is within a predetermined distance, e.g. suitably of about 800 m, from the road junction. It will be appreciated that this predetermined distance can generally be set as desired, and may be set differently for different road junctions and/or for different user preferences. For the remainder of the journey along the determined route 700, the display provides normal navigation guidance. FIGS. 9A-9D illustrate an example of how the display may transition into the lane guidance mode when the navigation device is approaching a junction. Thus, FIG. 9A shows the default navigational guidance view wherein a first route line 901 is provided showing the continuation of the route within the navigation map 900 alongside an icon 902 showing the current position of the navigation apparatus along the route. Upon determining that the navigation device is approaching the junction (e.g. is at a predetermined threshold distance of the junction), a lane guidance panel 910 may start to move in from the bottom of the display to cover the lower portion of the navigation map 900 (including the icon 902 indicating the current position of the navigation apparatus), as shown in FIG. 9B. Whilst the lane guidance panel 910 is being rendered, as explained above, the first route line 901 is faded out, as shown in FIG. 9C, and replaced by a second route line 912 in this case comprising a 'lane tube' indicating each of the (three) currently valid lanes for continuing along the route, and extending this lane information beyond the junction. The completed transition is shown in FIG. 9D. (As mentioned above, it is also contemplated that the first route line 901 may continue to be visible during the lane guidance mode. In this case, the second route line 912 only needs to be rendered on the lane guidance panel 910. Since the second route line 912 is also generated using the same map data as the first route line 901, the second route line 912 will generally align with the first route line 901 at the boundary line at the upper edge of the lane guidance panel 910 so that the continuation of the route is visualised). The display will then evolve as the navigation device approaches the road junction in a similar manner to that described in relation to FIGS. 6A-6D above. Thus, after passing the road junction, and particularly after passing the split point of the junction, such that lane guidance information is no longer be required, the display will return to the normal navigation guidance view. However, where there are multiple junctions in close proximity (e.g. less than 800 m, or even less than 400 m, of each other), the display remains in the lane guidance mode, but the position of the lane guidance panel is shifted dynamically based on the position of the next junction.

Figure 10:
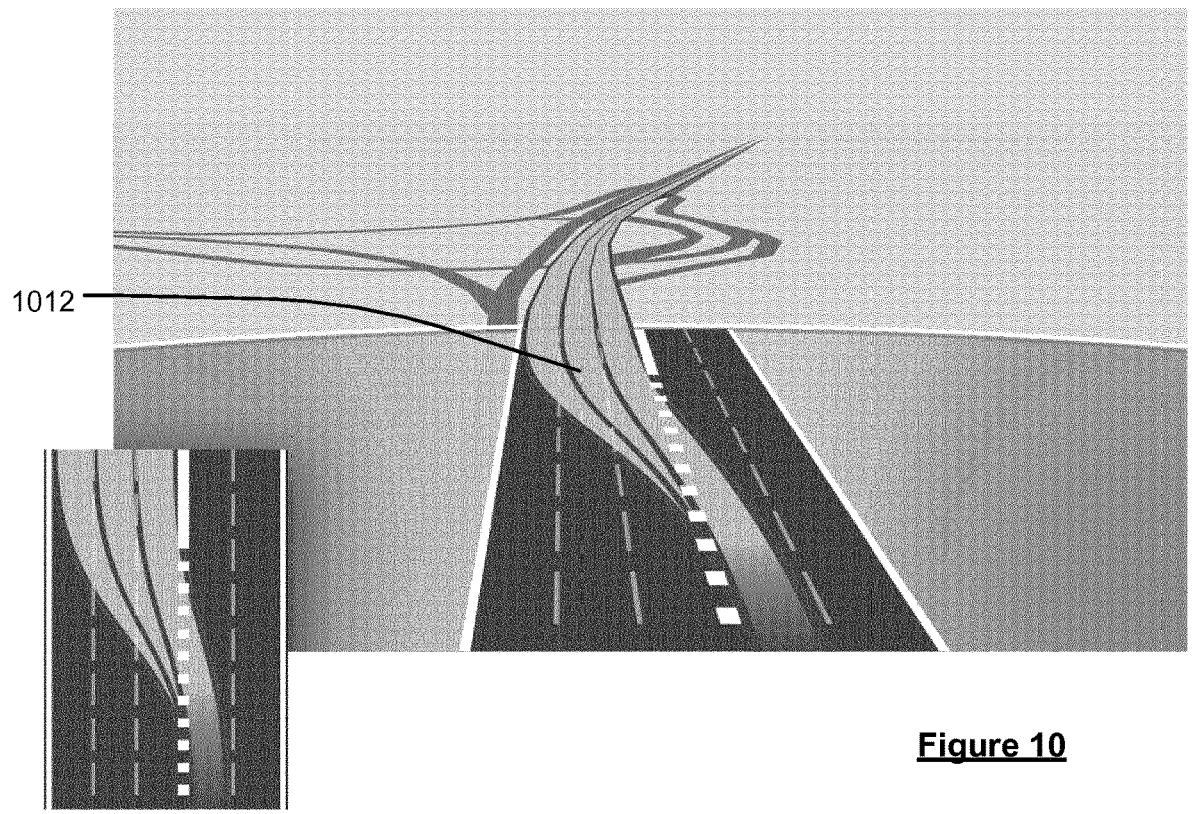
FIG. 10 shows schematically an example of how the route line displayed on the lane guidance panel may be used to (additionally) indicate a lane switching manoeuvre.
Figure 11A:
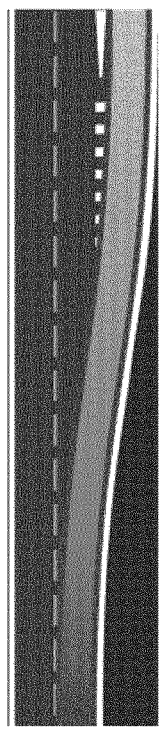
FIGS. 11A, 11B and 11O show further examples of visualisations of lane switching manoeuvres.
Figure 11B:
Figure 11C:

The second route line 612 may simply indicate amongst the full set of lanes the set of lanes that are currently valid for continuing along the route, e.g. as shown in FIG. 8. However, the second route line 612 may also be used to provide lane switch information. For example, if a lane manoeuvre is required to continue along the determined route this may be visualised by rendering the second route line as a smooth curve 1012, e.g. as shown in FIG. 10. In particular, FIG. 10 shows an example where a vehicle must switch into one of the three leftmost lanes, any of which are valid for continuing along the route. Thus, as shown, the second route line 1012 curves to left, and also increases in width to indicate the increased number of valid lanes. Various other examples of visualisations of lane manoeuvres are shown in FIGS. 11A-11O which respectively illustrate a user being instructed to exit a roadway; an example of a lane merge; and an example of a lane switch. In general, as shown, the lane manoeuvres may be indicated as soon as the lane manoeuvre is possible (e.g. as determined using lane connectivity information typically available in the map). For example, FIG. 11A shows the situation where the user must ultimately exit the roadway via an exit lane that is not yet available. Thus, when the user approaches the exit, the route line highlights the rightmost lane to prepare the user for the upcoming exit. The route line may then be extended, as a smooth curve, into the exit roadway once the exit lane appears on the lane guidance panel and the manoeuvre can be made. The necessary lane manoeuvre may thus be indicated as soon as the blocked markings that lead to the split are available. Similarly, where roadways merge, the necessary lane manoeuvre may be indicated to end just before the blocked markings end, e.g. as shown in FIG. 11B.

Such lane manoeuvres may be required due to a change in the lane geometry, e.g. a new lane merging onto the roadway, or an exit lane appearing, as described above. However, it is also contemplated that such lane manoeuvres may be indicated to provide (real-time) lane-level guidance to a user. That is, where it is known which lane the vehicle is travelling in, the user may be provided with an indication of a required manoeuvre to switch into one of the set of valid lanes. For example, it is now generally possible to determine from the current position of the navigation device which lane the vehicle is actually travelling in. This may be determined only using information obtained from the global navigation system (GNSS) receiver, or may be supplemented using information from a camera, laser or other imaging sensor associated with the device in order to more accurately determine the lane location of the device. For example, substantial research has been carried out in recent years, in which image data from one or more video cameras mounted within a vehicle is analysed, e.g. using various image processing techniques, to detect and track the lane in which the vehicle is travelling. In preferred embodiments, the positioning information obtained from the GNSS receiver, and optionally one or more image sensors, is used together with map data indicating the number of lanes, geographic position and geometry to display lane guidance information to a user. For example, the current lane in which a vehicle is travelling in a multi-lane carriageway can be determined, for example, using the method set out in the paper "Multi-lane detection in urban driving environments using conditional random fields" authored by Junhwa Hur, Seung-Nam Kang, and Seung-Woo Seo, published in the proceedings of the Intelligent Vehicles Symposium, page 1297-1302. IEEE, (2013). Here, the portable navigation device may be provided with a data feed from a video camera, radar and/or lidar sensor and an appropriate algorithm used to process the received data in real-time to determine a current lane of the device or the vehicle in which the device is travelling. Alternatively, another device or apparatus, separate from the portable navigation device, such as a Mobileye system available from Mobileye N.V. may provide the determination of the current lane of the vehicle on the basis of these data feeds and then feed the determination of the current lane to the portable navigation device, for example by a wired connection or a Bluetooth connection. Reference is also made to the discussion in this regard in WO 2015/052312, of TomTom International B.V., and published 16 Apr. 2015; the entire contents of which are incorporated herein by reference. Accordingly, if it is determined that the vehicle is currently travelling in an invalid lane, the required lane manoeuvre may be indicated to the user by providing a suitably shaped (e.g. curved) route line on the lane guidance panel. On the other hand, if it is determined that the vehicle is currently in a valid lane, such that no lane manoeuvre is currently required, an indication may be provided instructing the user to stay in the lane, and also indicating any other valid lanes.

Figure 12:
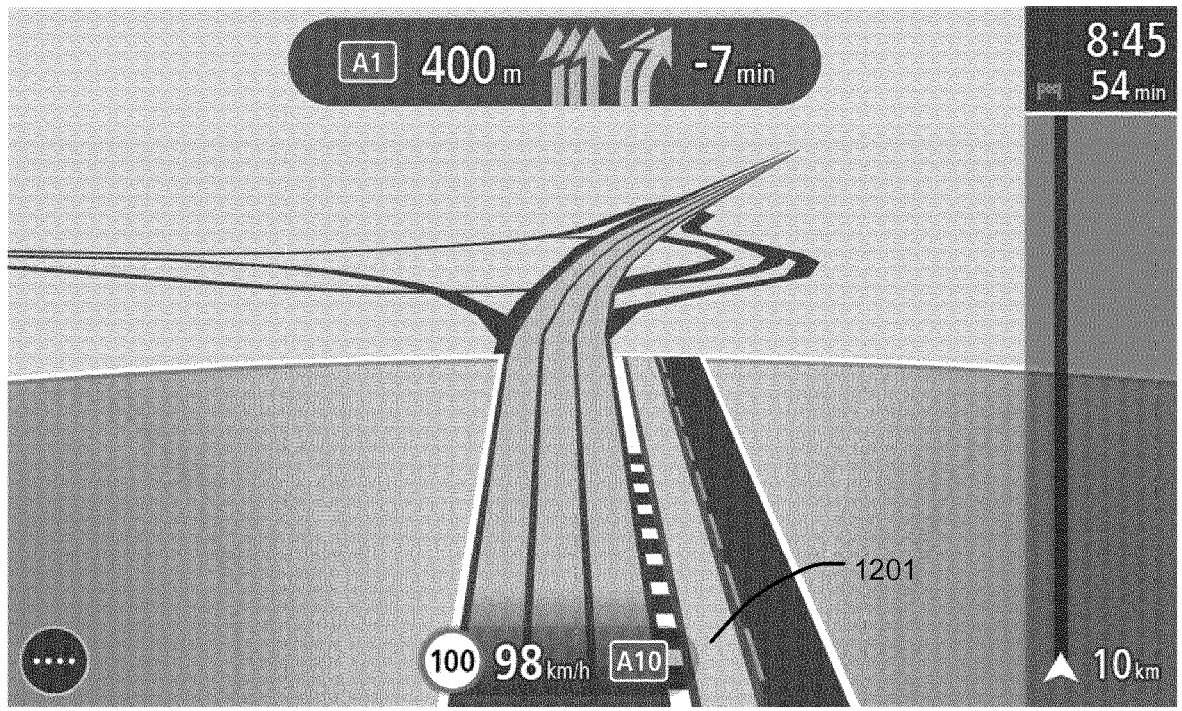
FIG. 12 shows schematically how alternative routes may also be displayed on the lane guidance panel.

It is contemplated that the lane guidance panel may, in addition to showing the set of valid lanes for the determined route along which the vehicle is travelling, also show valid lanes for alternative routes determined by the navigation device. As shown in FIG. 12, the valid lanes 1201 for an alternative route may also be highlighted but in a different colour or style relative to the valid lanes for the current route. As shown in FIG. 12, in order to avoid visual confusion, the valid lanes for the alternative route may be temporarily hidden from the map. However, it is contemplated, that the continuation of the alternative route into the navigation map may also be visualised, if desired.

Figure 13:
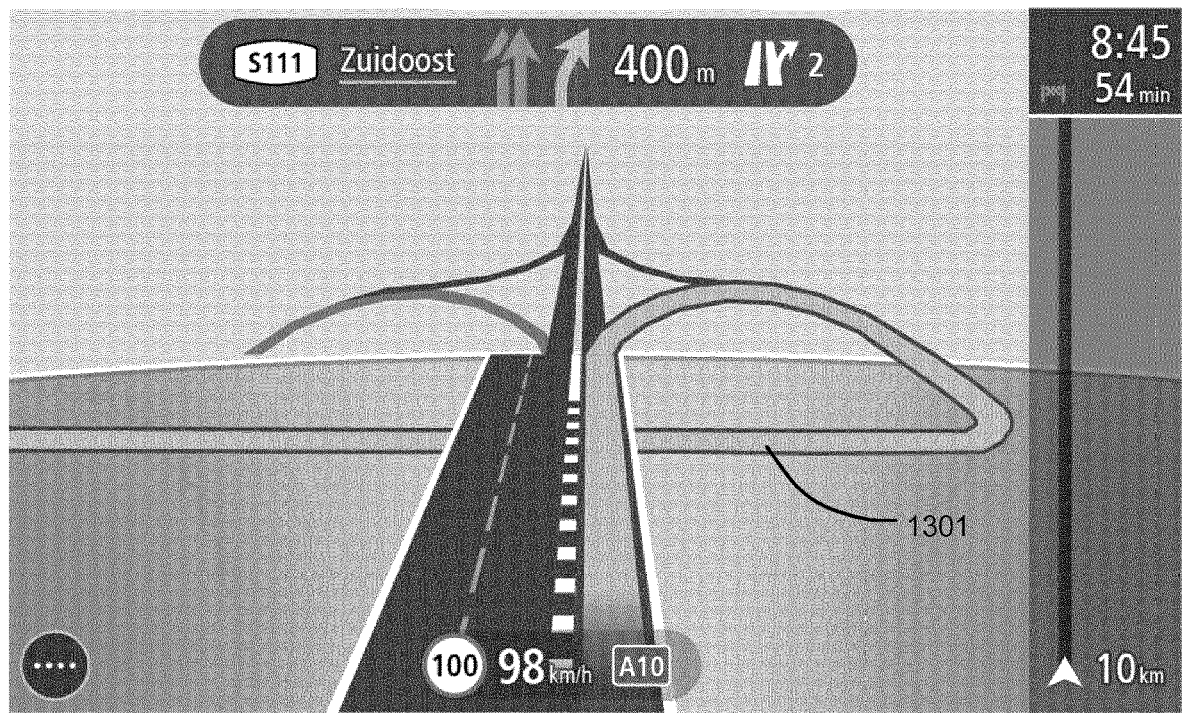
FIGS. 13 and 14 illustrate how underpass and overpass situations respectively may be visualised on the lane guidance panel.
Figure 14:
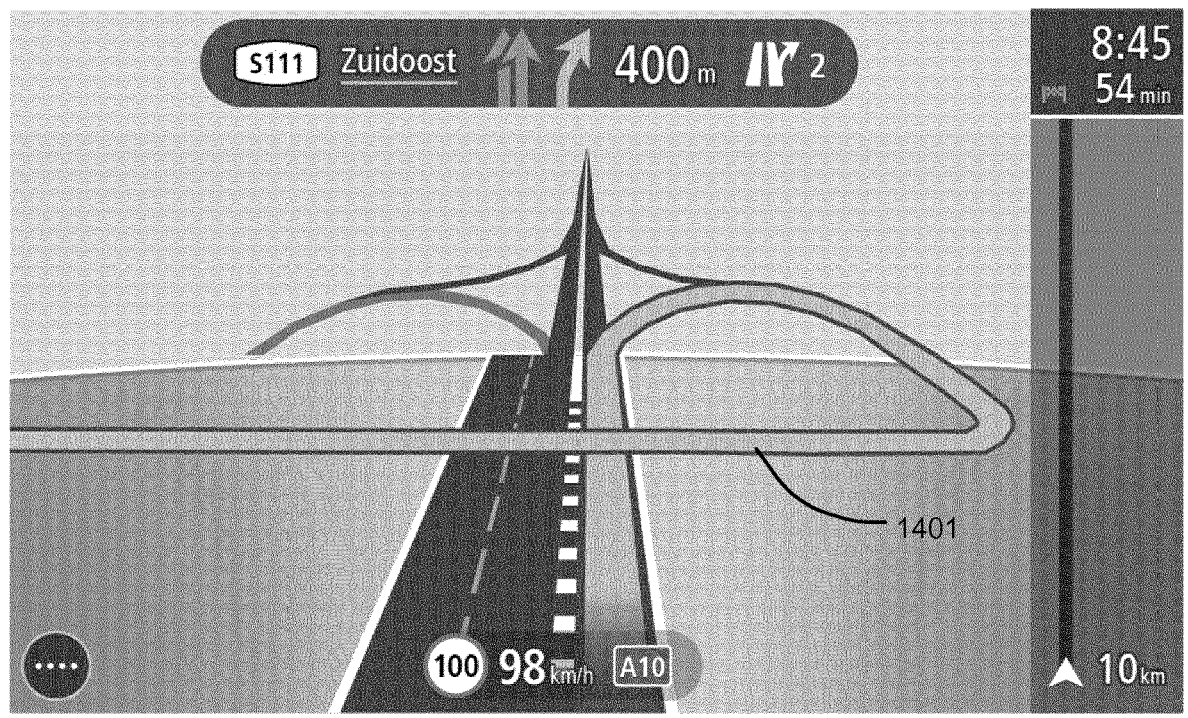

In some cases, e.g. for an under or overpass, or wherein the route involves a U-turn, the continuation of the route beyond the junction may extend into the portion of the map that is covered by the lane guidance panel. In this case, it may be desired to visualise the extension of the route line on the lane guidance panel. For example, FIG. 13 shows an example of a visualisation of a road situation wherein the continuation of the route 1301 after the decision point passes underneath the lanes that are illustrated on the lane guidance panel. Similarly, FIG. 14 shows an example of a visualisation of a road situation wherein the continuation of the route 1401 passes over the lanes that are illustrated on the lane guidance panel.

It will be appreciated that various other information may also be displayed to the user during the lane guidance mode. For instance, as shown in FIGS. 12, 13 and 14, the display may also present the user with the current speed limit, estimated arrival time, and other such information that is typically presented to a user by a navigation device. Although not shown in the figures, it is also contemplated that a moving indicator (such as a straight line over the valid lanes) may be provided on the lane guidance panel showing the current position of the vehicle, as it will be appreciated that the icon showing the current position of the vehicle in the schematic map 600 would generally be covered by the lane guidance panel. Traffic information, including lane level traffic (where such data is available), could also be shown on the lane guidance panel.

It will be appreciated that the map and/or lane guidance panel could also be provided in a 2D view, or in a combination of both. However, preferably, the visualisation of the schematic map and lane guidance panel is a 3D, or perspective, view. Thus, if the display is in a 2D navigation guidance mode (e.g. as shown in FIG. 4A) at the point at which the user is approaching the road junction, such that lane guidance is required, the display may temporarily change from the 2D navigation guidance view into a 3D view. Upon passing the junction, the display may switch back.

Although the present invention has been described with reference to various embodiments, it will be understood by those skilled in the art that various changes in form and detail may be made without departing from the scope of the invention as set forth in the accompanying claims.

The invention claimed is:

1. A method of providing information using navigation apparatus to guide a user in a vehicle along a determined route through a road network, the method comprising:
displaying, on a display device, a navigation map and a first route line, the first route line showing one or more roads to be taken from a current position of the navigation apparatus to follow the determined route through the road network, and the navigation map and the first route line being updated as the vehicle travels along the determined route;
generating, upon determining, while the vehicle is traveling along the determined route, that the current position of the navigation apparatus on a given multi-lane roadway is approaching a road junction, data indicative of a lane guidance panel based on a position of the road junction in the navigation map that, when displayed on the display device, covers a portion of the navigation map;
generating data indicative of a second route line for display at least on the lane guidance panel indicating one or more lanes in which the user should be travelling so as to follow the determined route;
providing the data indicative of the lane guidance panel and the second route line to the display device for display thereon; and
displaying, on the display device, the navigation map including the first route line and the lane guidance panel including the second route line, the lane guidance panel being arranged in the display to cover a portion of the navigation map and so that the second route line in the lane guidance panel aligns with the first route line in the navigation map at a boundary line separating the lane guidance panel from the navigation map so as to show a continuation to the determined route beyond the road junction.

2. The method of claim 1, wherein the portion of the navigation map covered by the lane guidance panel is based on the position of the road junction in the navigation map such that the lane guidance panel covers the portion of the navigation map including an area between the current position of the navigation apparatus and the position of the road junction.

3. The method of claim 1, wherein the lane guidance panel, when displayed on the display device, extends from a lower edge of the navigation map displayed on the display device up to the boundary line based on the position of the road junction in the navigation map, wherein a position of the boundary line moves towards the lower edge of the navigation map as the navigation apparatus approaches the road junction.

4. The method of claim 1, wherein a position of the second route line is based on a position of the first route line.

5. The method of claim 1, where the second route line extends continuously from the lane guidance panel into a portion of the navigation map that is not covered by the lane guidance panel to show the continuation of the determined route beyond the road junction.

6. The method of claim 1, further comprising generating data indicative of a lane image for display on the lane guidance panel, the lane image showing lanes of the given multi-lane roadway.

7. The method of claim 6, wherein a position of the lane image is determined based on a position of the first route line and/or a position of the second route line.

8. The method of claim 1, further comprising determining that the current position of the navigation apparatus is approaching the road junction by determining whether the current position of the navigation apparatus is at a predetermined distance from the road junction, wherein said data indicative of the lane guidance panel is generated in response to determining that the current position of the navigation apparatus is at the predetermined distance from the road junction.

9. The method of claim 1, further comprising generating data indicative of a third route line, for display at least on the lane guidance panel, showing a set of lanes in which the user should be travelling so as to follow an alternative route through the road network to a destination for the determined route.

10. The method of claim 1, wherein when the navigation map is a 2D representation, at a time when the navigation apparatus is determined to be at a predetermined distance from the road junction, the navigation map is changed to instead show a 3D representation.

11. The method of claim 1, further comprising determining current lane of the given multi-lane roadway in which the vehicle is travelling, and if travelling in the current lane does not allow the vehicle to continue travelling along the determined route, indicating on the lane guidance panel a lane manoeuvre required to continue along the determined route.

12. The method of claim 11, wherein the lane manoeuvre required to continue along the determined route is indicated by a curvature, or a curved portion, of the second route line.

13. A system for providing information using a navigation apparatus to guide a user in a vehicle along a determined route through a road network, the system comprising one or more processing resources including respective processing circuitry and a display device, the one or more processing resources configured to:
display, on the display device, a navigation map and a first route line, the first route line showing one or more roads to be taken from a current position of the navigation apparatus to follow the determined route through the road network, and the navigation map and the first route line being updated as the vehicle travels along the determined route;
generate data indicative of a lane guidance panel, wherein the data indicative of the lane guidance panel is generated upon determining, while the vehicle is traveling along the determined route, that the current position of the navigation apparatus on a given multi-lane roadway is approaching a road junction, and wherein the data indicative of the lane guidance panel is generated based on a position of the road junction in the navigation map;
generate data indicative of a second route line for display at least on the lane guidance panel indicating one or more lanes in which the user should be travelling so as to follow the determined route; and
display, on the display device, the navigation map including the first route line and the lane guidance panel including the second route line, the lane guidance panel being arranged in the display to cover a portion of the navigation map and so that the second route line in the lane guidance panel aligns with the first route line in the navigation map at a boundary line separating the lane guidance panel from the navigation map so as to show a continuation to the determined route beyond the road junction.

14. A non-transitory computer-readable storage medium storing instructions that, when executed by one or more processors of a system, cause the system to perform a method for providing information using a navigation apparatus to guide a user in a vehicle along a determined route through a road network, the method comprising:
displaying, on a display device, a navigation map and a first route line, the first route line showing one or more roads to be taken from a current position of the navigation apparatus to follow the determined route through the road network, and the navigation map and the first route line being updated as the vehicle travels along the determined route,
generating, upon determining, while the vehicle is traveling along the determined route, that the current position of the navigation apparatus on a given multi-lane roadway is approaching a road junction, data indicative of a lane guidance panel based on a position of the road junction in the navigation map;
generating data indicative of a second route line for display at least on the lane guidance panel indicating one or more lanes in which the user should be travelling so as to follow the determined, route;
providing the data indicative of the lane guidance panel and the second route line to the display device for display thereon; and
displaying, on the display device, the navigation map including the first route line and the lane guidance panel including the second route line, the lane guidance panel being arranged in the display to cover a portion of the navigation map and so that the second route line in the lane guidance panel aligns with the first route line in the navigation map at a boundary line separating the lane guidance panel from the navigation map so as to show a continuation to the determined route beyond the road junction.

15. The system of claim 13, wherein the portion of the navigation map covered by the lane guidance panel is based on the position of the road junction in the navigation map such that the lane guidance panel covers the portion of the navigation map including an area between the current position of the navigation apparatus and the position of the road junction.

16. The system of claim 13, wherein the lane guidance panel, when displayed on the display device, extends from a lower edge of the navigation map displayed on the display device up to the boundary line based on the position of the road junction in the navigation map, wherein a position of the boundary line moves towards the lower edge of the navigation map as the navigation apparatus approaches the road junction.

17. The system of claim 13, where the second route line extends continuously from the lane guidance panel into the portion of the navigation map that is not covered by the lane guidance panel to show the continuation of the determined route beyond the road junction.

18. The non-transitory computer-readable storage medium of claim 14, wherein the portion of the navigation map covered by the lane guidance panel is based on the position of the road junction in the navigation map such that the lane guidance panel covers the portion of the navigation map including an area between the current position of the navigation apparatus and the position of the road junction.

19. The non-transitory computer-readable storage medium of claim 14, wherein the lane guidance panel, when displayed on the display device, extends from a lower edge of the navigation map displayed on the display device up to the boundary line based on the position of the road junction in the navigation map, wherein a position of the boundary line moves towards the lower edge of the navigation map as the navigation apparatus approaches the road junction.

20. The non-transitory computer-readable storage medium of claim 14, where the second route line extends continuously from the lane guidance panel into the portion of the navigation map that is not covered by the lane guidance panel to show the continuation of the determined route beyond the road junction.

* * * * *